United States Patent
King

(10) Patent No.: US 9,416,933 B2
(45) Date of Patent: Aug. 16, 2016

(54) MULTI-FUNCTION LED HEADLAMP

(71) Applicant: Valeo Lighting Systems North America, LLC, Seymour, IN (US)

(72) Inventor: Robert Lee King, Seymour, IN (US)

(73) Assignee: Valeo North America, Inc., Seymour, IN (US)

( * ) Notice: Subject to any disclaimer, the term of this patent is extended or adjusted under 35 U.S.C. 154(b) by 0 days.

(21) Appl. No.: 14/497,461

(22) Filed: Sep. 26, 2014

(65) Prior Publication Data

US 2015/0092436 A1 Apr. 2, 2015

Related U.S. Application Data

(60) Provisional application No. 61/883,277, filed on Sep. 27, 2013.

(51) Int. Cl.
*F21V 17/02* (2006.01)
*F21S 8/10* (2006.01)

(52) U.S. Cl.
CPC ......... *F21S 48/1721* (2013.01); *F21S 48/1154* (2013.01); *F21S 48/1216* (2013.01); *F21S 48/1225* (2013.01); *F21S 48/1705* (2013.01); *F21S 48/1747* (2013.01); *F21S 48/1778* (2013.01); *B60Q 2400/30* (2013.01); *F21S 48/1323* (2013.01); *F21S 48/328* (2013.01)

(58) Field of Classification Search
CPC .............. F21S 48/1721; F21S 48/1225; F21S 48/1154; F21S 48/1216; F21S 48/1778; F21S 48/1747; F21S 48/1705; F21S 48/328; F21S 48/1323; B60Q 2400/30
USPC .................................. 362/513, 512, 543, 544
See application file for complete search history.

(56) References Cited

U.S. PATENT DOCUMENTS

| | | | |
|---|---|---|---|
| 4,987,521 A * | 1/1991 | Fratty | F21S 48/1186 362/277 |
| 5,060,120 A | 10/1991 | Kobayashi et al. | |
| 5,588,733 A | 12/1996 | Gotou | |
| 6,049,749 A | 4/2000 | Kobayashi | |
| 6,467,940 B2 | 10/2002 | Eschler et al. | |
| 6,626,565 B2 | 9/2003 | Ishida | |
| 6,764,209 B2 | 7/2004 | Nouet et al. | |

(Continued)

FOREIGN PATENT DOCUMENTS

| | | | | |
|---|---|---|---|---|
| CN | 102519001 A | * | 6/2012 | |
| DE | WO 2009040710 A2 | * | 4/2009 | ........... B60Q 1/1423 |

OTHER PUBLICATIONS

Machine English Translation of CN102519001(A) Zhou et al. Jun. 27, 2012.*

*Primary Examiner* — Anh Mai
*Assistant Examiner* — Glenn Zimmerman
(74) *Attorney, Agent, or Firm* — Jacox, Meckstroth & Jenkins

(57) ABSTRACT

A multifunction LED headlamp that utilizes a common light source and a plurality of shutter or mask members to produce a plurality of different light beam modes of operation. The plurality of shutter or mask members are generally opaque to occlude or mask light. Each of the plurality of shutter or mask members have at least one edge and the edge of a first one or the plurality of shutter or mask members cooperates with an edge of a second one of the plurality of shutter or mask members to provide or form a generally horizontal opening whose size is varied by pivoting the plurality of shutter or mask members towards or away from each other.

22 Claims, 36 Drawing Sheets

(56) References Cited

U.S. PATENT DOCUMENTS

| | | |
|---|---|---|
| 6,799,876 B2 | 10/2004 | Ravier |
| 7,008,094 B2 | 3/2006 | Taniuchi |
| 7,607,811 B2 | 10/2009 | Okada |
| 7,731,401 B2 | 6/2010 | King et al. |
| 8,177,402 B2 | 5/2012 | Ackermann et al. |
| 8,197,109 B2 | 6/2012 | Iwasaki |
| 2002/0109998 A1 | 8/2002 | Nouet et al. |
| 2004/0228139 A1 | 11/2004 | Taniuchi |
| 2005/0195613 A1 | 9/2005 | Morishita |
| 2005/0201117 A1* | 9/2005 | Sugimoto ........... F21S 48/1794 362/539 |
| 2009/0251915 A1* | 10/2009 | Boroczki ............ F21S 48/1778 362/512 |
| 2010/0027284 A1 | 2/2010 | Ackermann et al. |

* cited by examiner

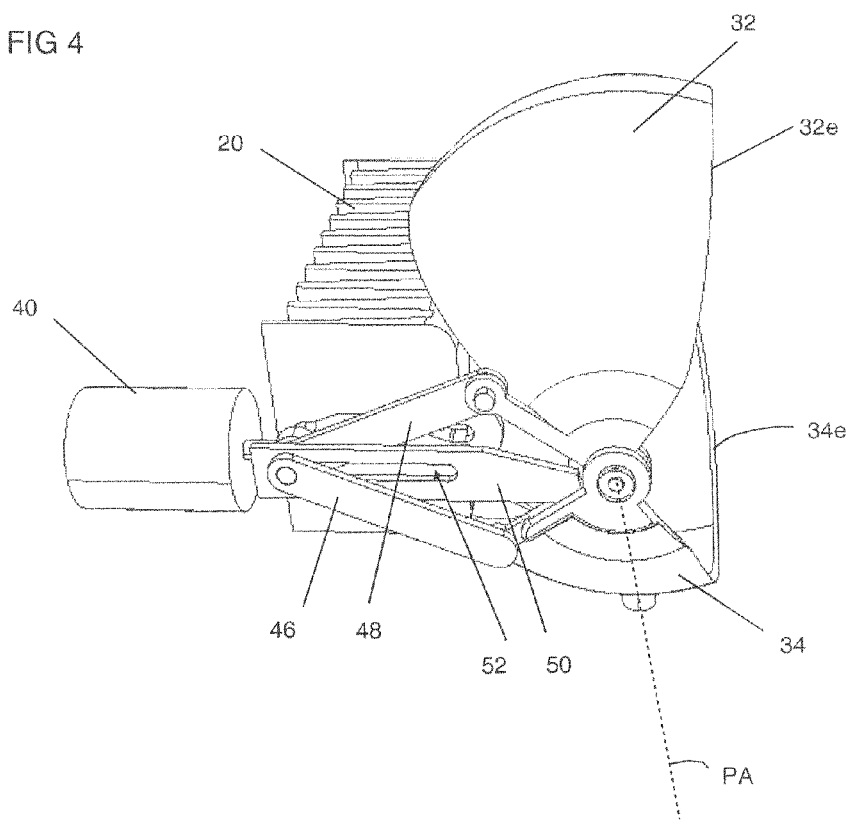

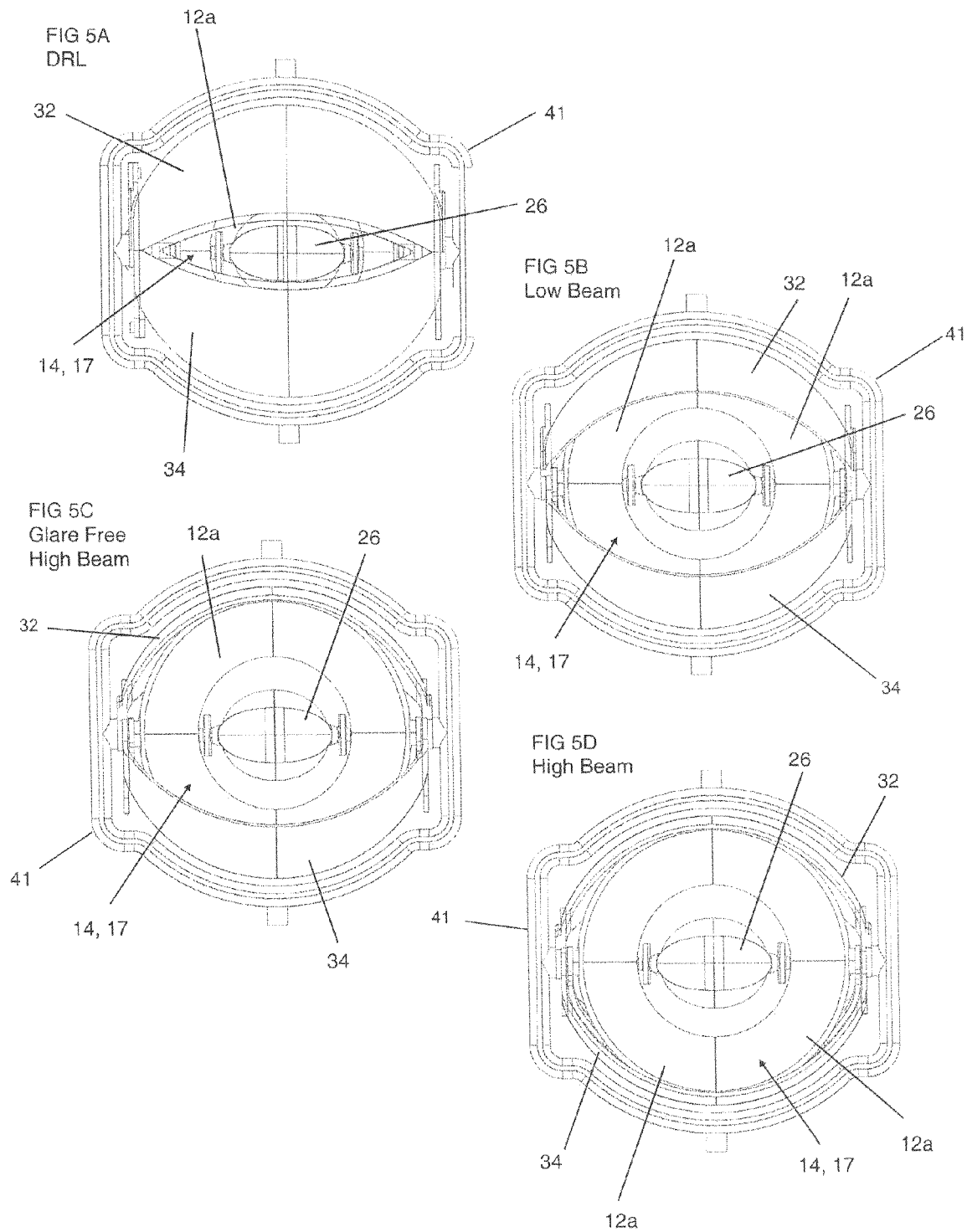

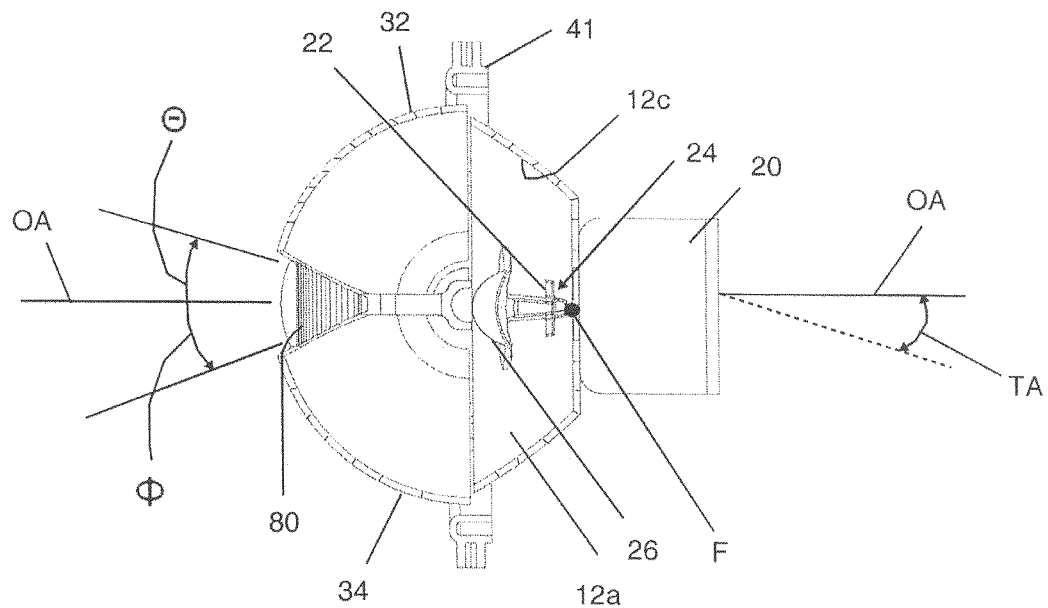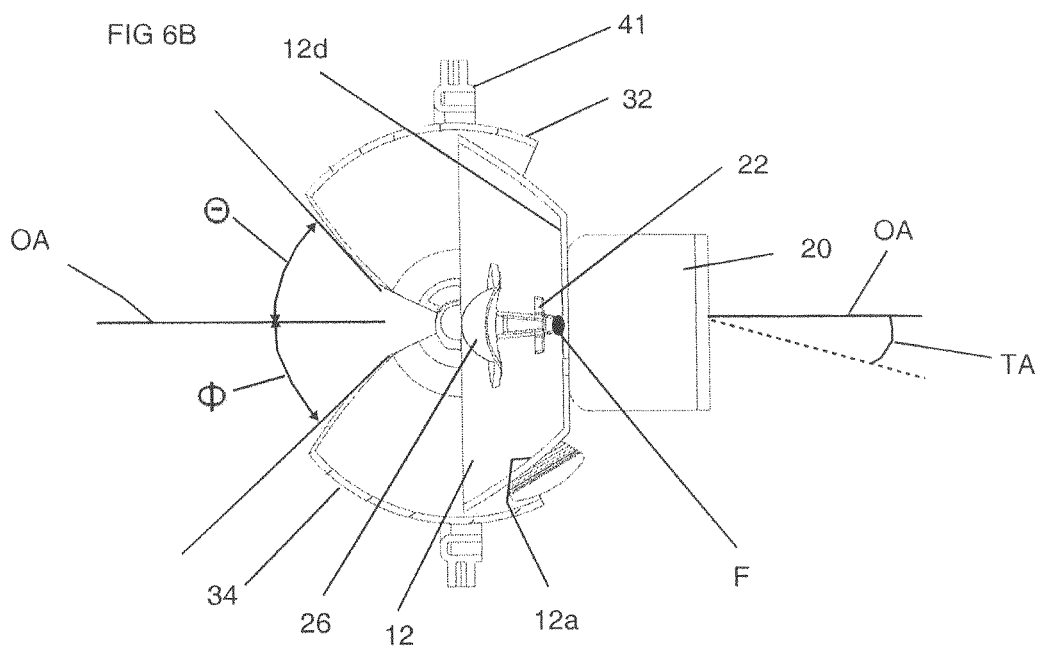

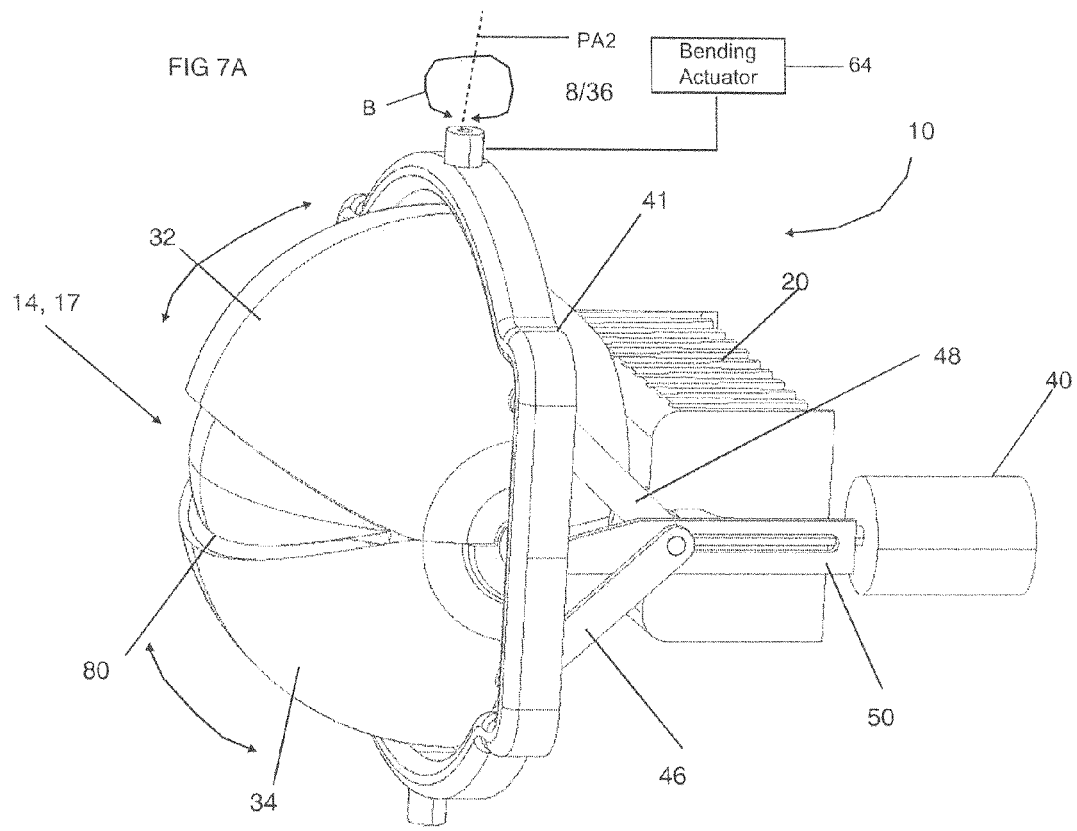
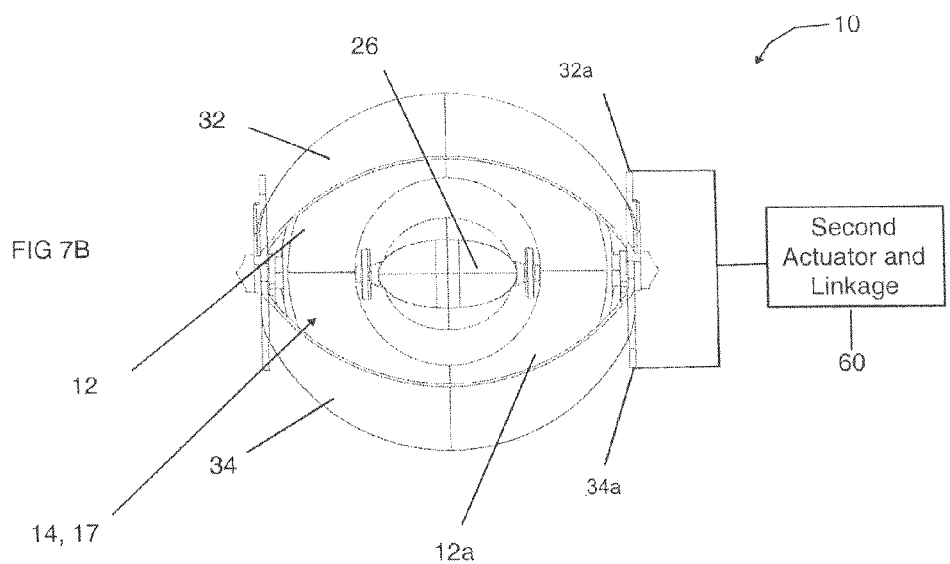

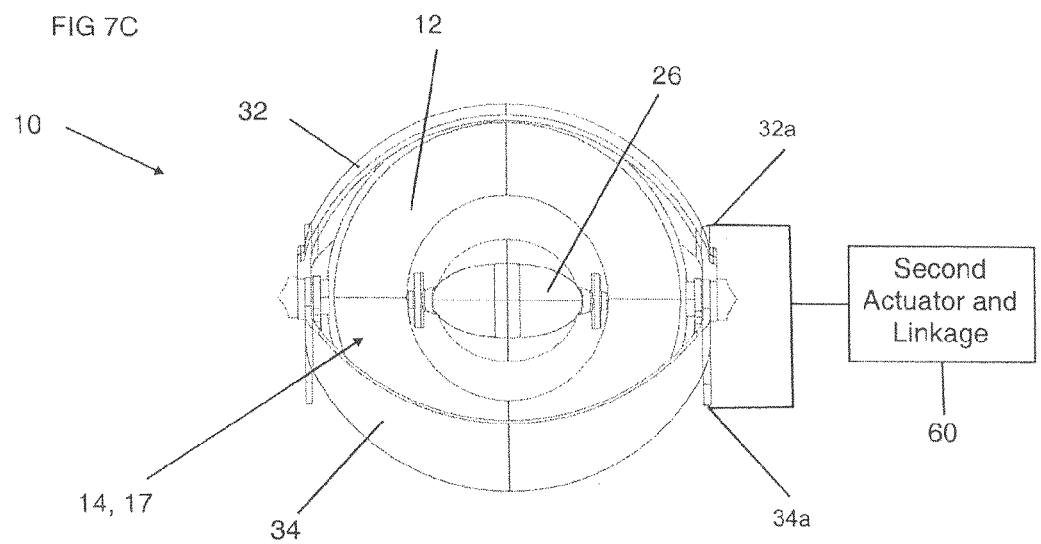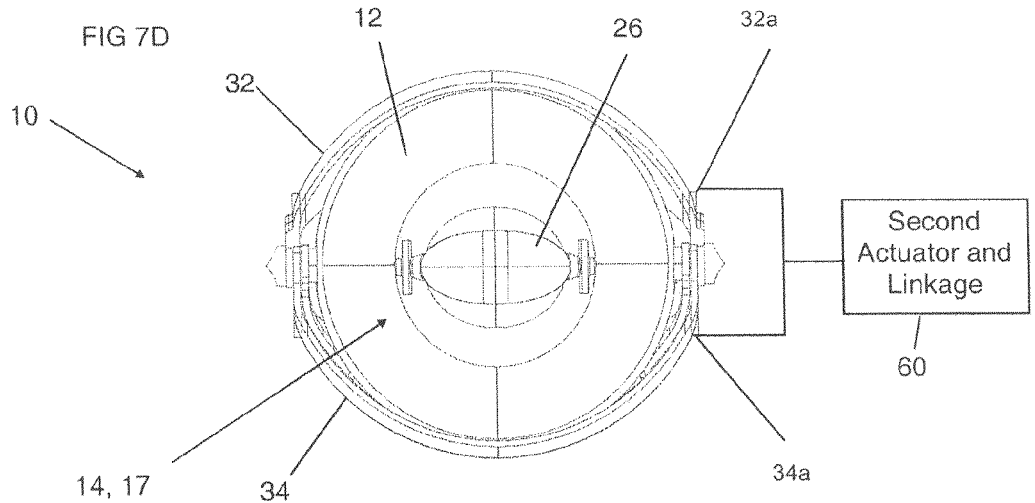

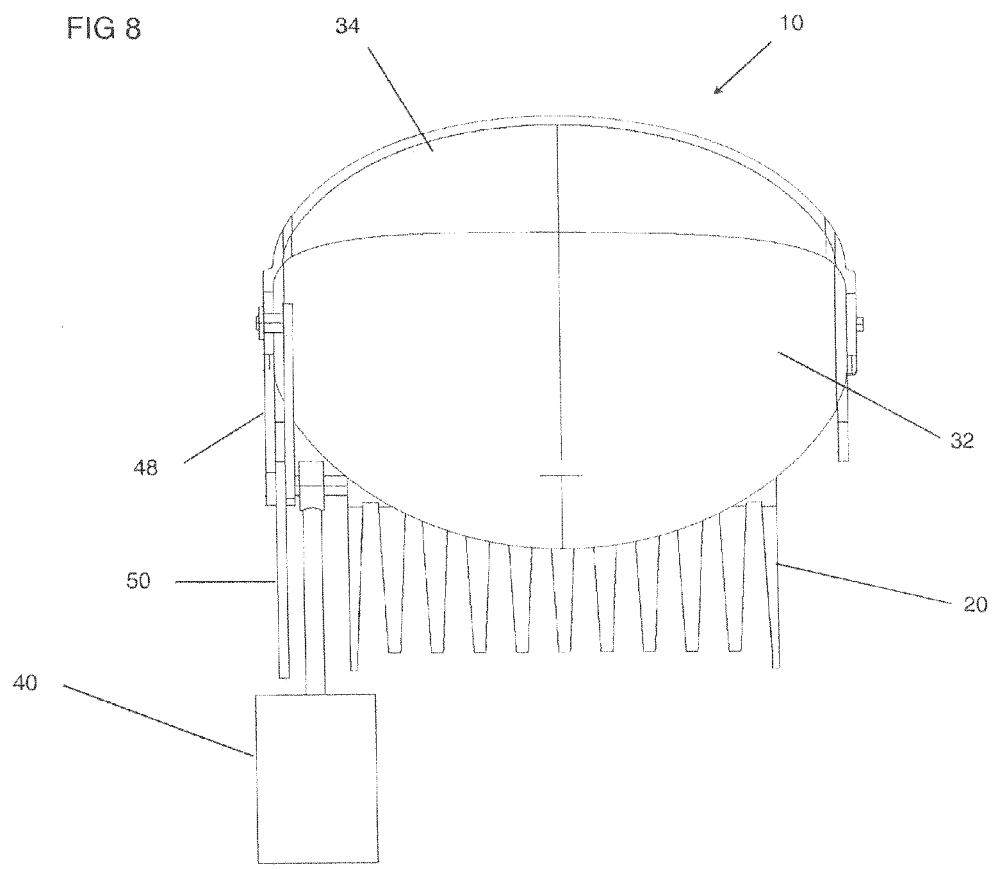

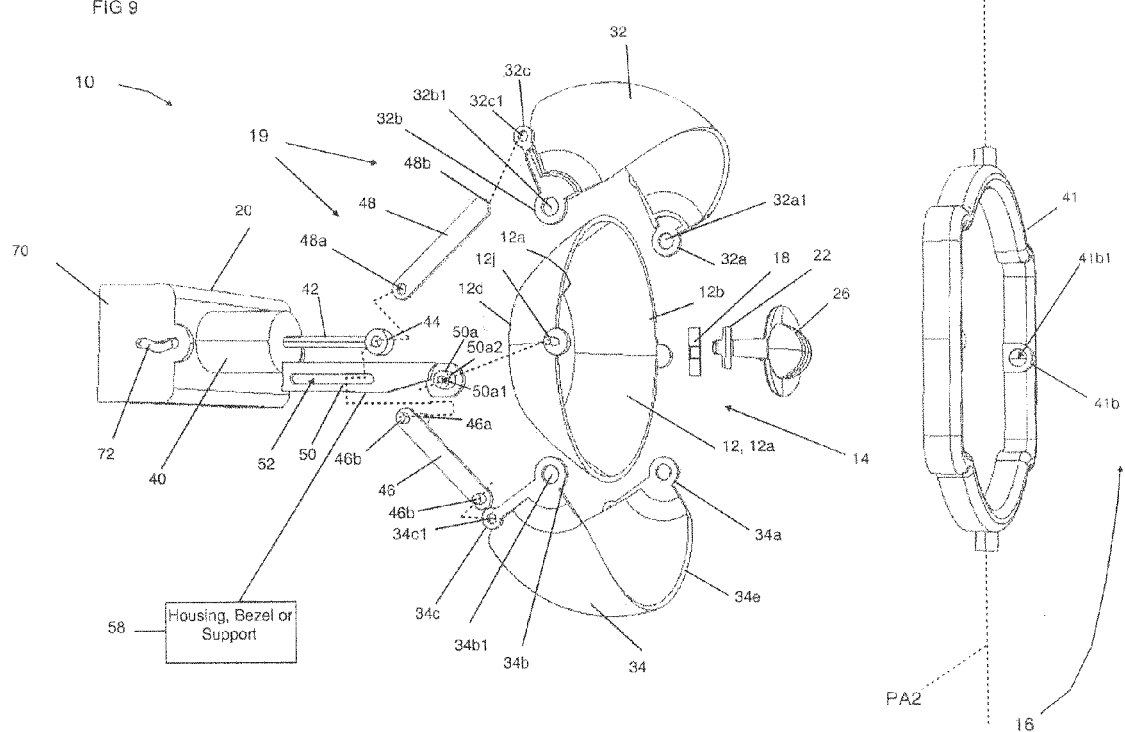

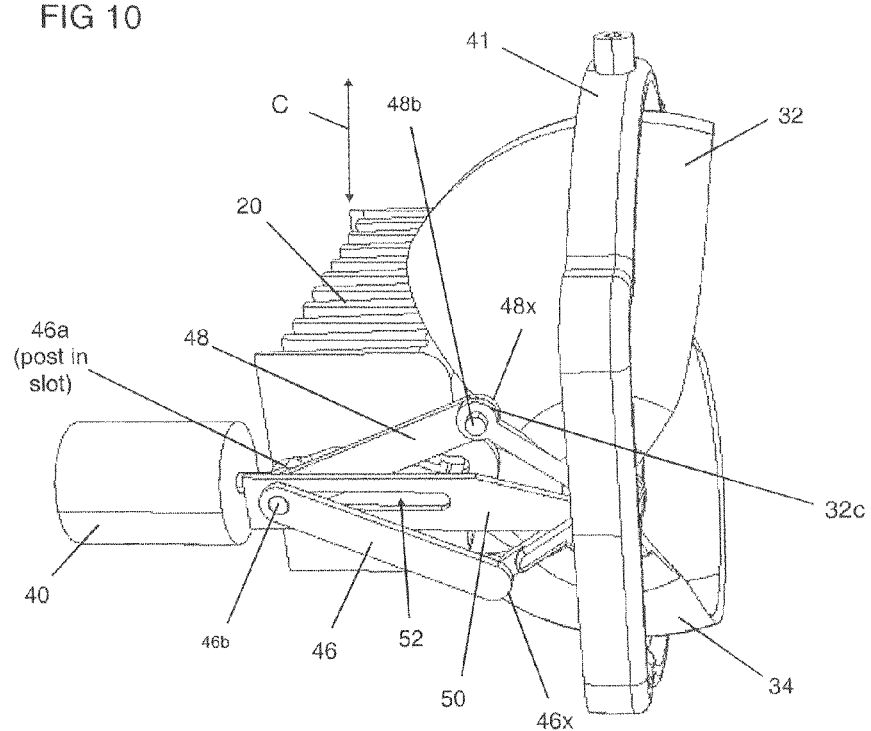

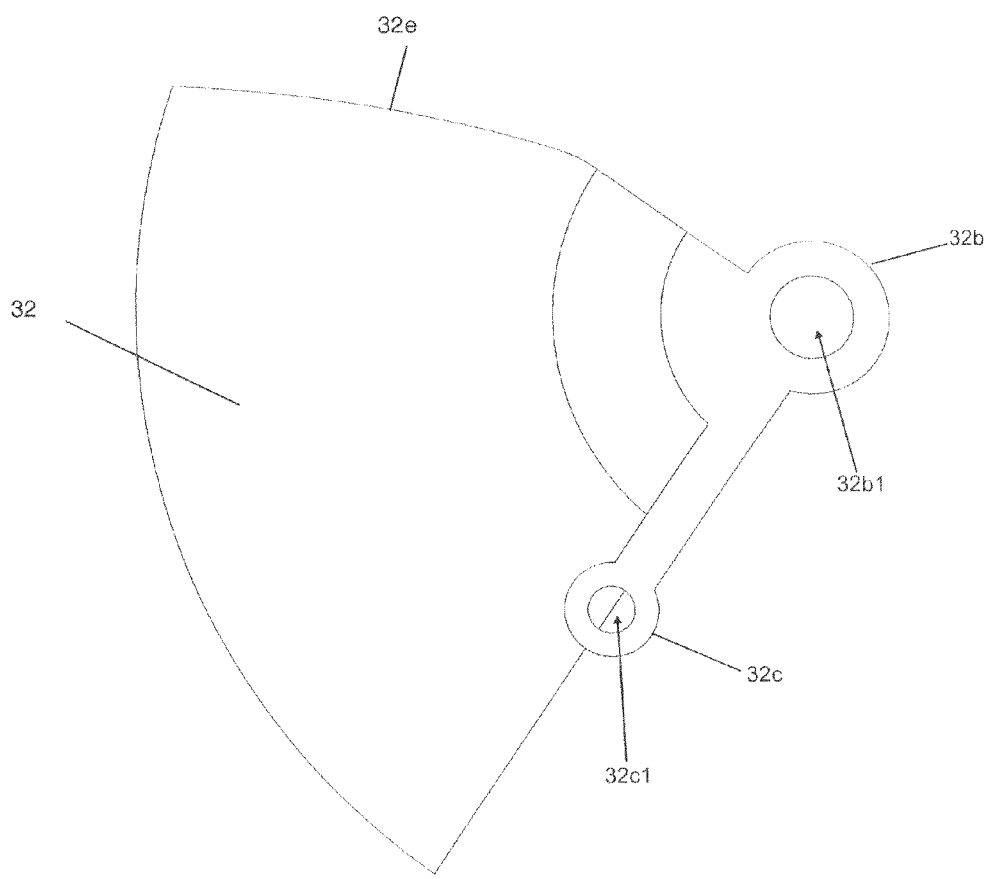

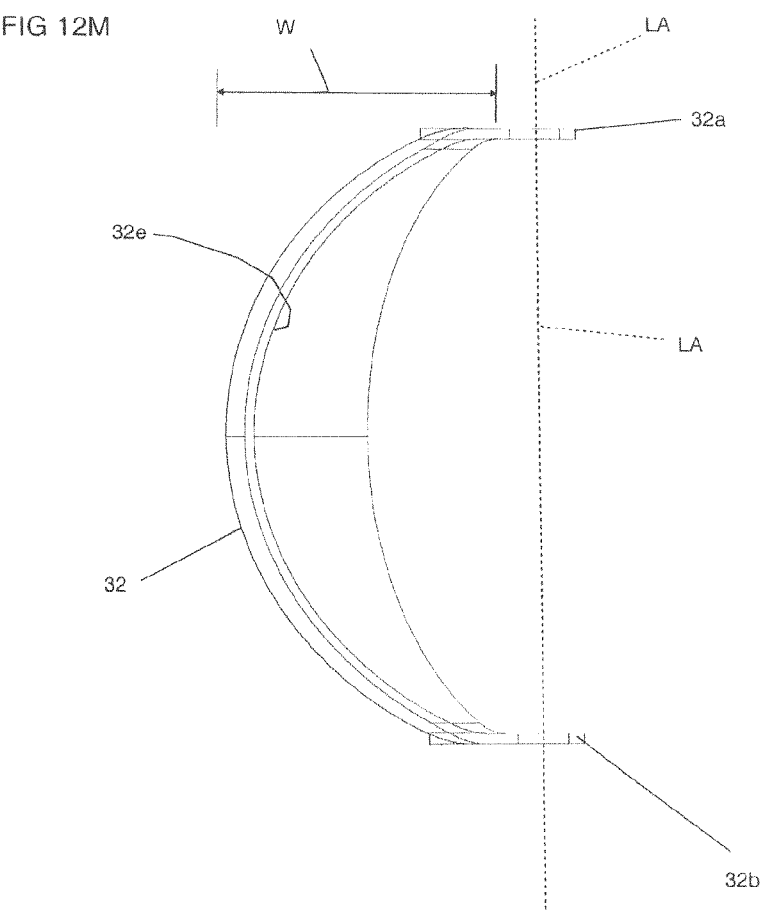

MULTI-FUNCTION LED HEADLAMP

CROSS-REFERENCE TO RELATED APPLICATION

The present application claims priority to provisional U.S. Application Ser. No. 61/883,277, filed Sep. 27, 2013, to which Applicant claims the benefit of the earlier filing date. This application is incorporated herein by reference and made a part hereof.

BACKGROUND OF THE INVENTION

1. Field of the Invention

The present disclosure relates generally to a low-cost LED vehicle headlamp that requires just one light source, such as a multichip LED in one embodiment and driver system to provide the functions of low beam (LB), high beam (HB) and daytime running lamp (DRL). It is also capable of additional lighting functions such as AFS swiveling left/right and dynamic shadowing of high beam a so-called "beam attic". The device can provide a glare-free high beam as well.

2. Description of the Related Art

It is known in U.S. Pat. No. 8,197,109 (Iwasaki) to build a headlamp with a single beam pattern that can be configured as either a low beam or a high beam by adjusting the shape of the mirrors, but does not disclose a dual function lamp having both low beam and high beam patterns. Iwasaki '109 uses two different reflectors, one of which makes the spread light, the other makes the hotspot (or "kink"). It is understood that the apparatus disclosed therein is utilized commercially in the Nissan Leaf automobile.

The company Ichikoh Industries, Ltd. of Shanghai, China, markets an LED headlamp that has been reviewed by the inventor herein and which provides both low beam and high beam and which incorporates one LED light source, a shell-like reflector, and a movable shutter that makes a clicking noise as it alternates between high and low beam, referred to sometimes as the "chirp-chirp" headlamp. It has two physical reflector mirrors that rotate approximately 120 degrees to expose the LED to different optical surfaces that changes the light beam pattern from a low beam pattern to a high beam pattern.

The following headlamp devices are known: U.S. Pat. No. 7,731,401 (King); U.S. Pat. No. 6,799,876 (Ravier); U.S. Pat. No. 6,467,940 (Eschler); U.S. Pat. No. 5,588,733 (Gotou); U.S. Pat. No. 7,607,811 (Okada); U.S. Pat. No. 6,626,565 (Ishida); U.S. Pat. No. 5,060,120 (Kobayashi); U.S. Pat. No. 6,049,749 (Koayashi); and US Published Applications 2002/0109998 (Nouet); 2010/0027284 (Ackermann); 2004/0228139 (Taniuchi); and 2005/0195613 (Masahiko).

The problem with approaches of the prior art is that they did not provide means or capability to perform a plurality of lighting mode functions using a single light source.

SUMMARY OF THE INVENTION

An object of one embodiment is to provide a system and method for providing a headlamp that utilizes a single light source, such as a multichip LED to provide a plurality of different light beam mode functions.

Another object is to provide a system and method for selectively occluding or masking light from a light source in order to produce a plurality of different light beams.

Another object is to provide a headlamp that is capable of producing a plurality of different light beam modes, such as a low beam mode, a high beam mode, a glare free high beam mode and a daytime running light (DRL) mode utilizing a common light source in order to reduce or eliminate the need for providing a plurality of light sources for each different light beam mode.

Still another object of the invention is to provide a system, means and apparatus for selectively occluding light to provide a plurality of light beam modes utilizing a single light source.

Yet another object is to provide a shutter assembly having a plurality of shutters for occluding light to provide the plurality of light beam mode functions.

Still another object is to provide the shutter assembly that can be actuated by a single actuator.

Another object is to provide a shutter assembly that can perform not only the plurality of different modes of operation mentioned, but can also provide a dynamic bending light and adaptive steering lighting.

In one aspect, one embodiment of the invention comprises a headlamp comprising a reflector having a reflective inner surface defining a cavity with an open end facing a field to be illuminated and having a focus, the reflector being adapted to receive at least one LED light source comprising at least one LED positioned at or near the focus and adapted to generate light rays, a lens intermediate the at least one LED light source and the field to be illuminated and adapted to receive at least some of the light rays and emit them toward the field to be illuminated, and a shutter assembly having a plurality of shutter or mask members that are adapted to be moved to a plurality of different predetermined positions so that they can cooperate to occlude or mask at least a portion of the light rays to produce a plurality of different light beam modes, respectively, toward the field to be illuminated.

In another aspect, another embodiment of the invention comprises a headlamp comprising a reflector for reflecting light rays from a LED light source toward a field to be illuminated, a lens situated between the reflector and the field to be illuminated, a shutter assembly downstream of the reflector, the shutter assembly having a plurality of shutter or mask portions selectively displaceable in order to occlude light to perform a plurality of different lighting beam modes using the same the LED light source for each of the plurality of different lighting beam modes.

This invention, including all embodiments shown and described herein, could be used alone or together and/or in combination with one or more of the following list of features:

The headlamp which further comprises at least one actuator or driver coupled to the plurality of shutter or mask members and adapted to drive the plurality of shutter or mask members between open and closed positions to at least one of the plurality of different predetermined positions in order to produce at least one of the plurality of different light beam modes.

The headlamp wherein the plurality of shutter or mask members comprises a first shutter or mask member and a second shutter or mask member, the at least one actuator or driver being drivingly coupled to the first and second shutter or mask members and adapted to drive them between open and closed positions to at least one of the plurality of different predetermined positions in order to produce at least one of the plurality of different light beam modes.

The headlamp wherein each of the first shutter or mask member and the second shutter or mask member comprise a shape having a portion that lies in a generally spherical plane The headlamp wherein the first and second shutter or mask members have a common pivot axis, the at least one actuator or driver being adapted to drive the first and second shutter or mask members about the common axis.

The headlamp wherein the at least one actuator or driver substantially simultaneously pivotally drives the first and second shutter or mask members about the common pivot axis to the plurality of different predetermined positions.

The headlamp wherein the common pivot axis is a generally horizontal pivot axis.

The headlamp wherein the headlamp comprises a pivot member for pivoting or tilting the reflector a predetermined angle about a tilting axis for each of the plurality of different light beam modes substantially simultaneously during moving of the plurality of shutter or mask members to the plurality of different predetermined positions.

The headlamp wherein the pivot member comprises a camming slot for receiving a follower, at least one of the camming slot or the follower being associated with the reflector and the other of which moves in response to the at least one actuator actuating the plurality of shutter or mask members, thereby causing the pivoting or tilting of the reflector.

The headlamp wherein the predetermined angle is less than or equal to plus or minus 2 degrees.

The headlamp wherein the plurality of different light beam modes comprise a low beam mode, a high beam mode, a glare free high beam mode and a daytime running light (DRL) beam mode.

The headlamp wherein the plurality of different light beam modes comprises a low beam mode, a high beam mode, a glare free high beam mode and a daytime running light (DRL) beam mode, the at least one actuator or driver being adapted to drive the first and second shutter or mask members so that they move toward and away from each other to at least one of the plurality of predetermined positions, the at least one of the plurality of different predetermined positions comprising at least one of the following positions: a fully open position for producing the high beam mode wherein the first and second shutter or mask members are pivotally driven a first predetermined number of degrees to a fully open position; a DRL position for producing the daytime running light (DRL) mode; a low beam position for producing the low beam mode; and an intermediate glare-free high beam position for producing the glare free high beam mode.

The headlamp wherein the at least one actuator or driver drives the first and second shutter or mask members about a common pivot axis to each of the following plurality of different predetermined positions: a fully open position for producing a high beam mode wherein the first and second shutter or mask members are pivotally driven a first predetermined number of degrees to a fully open position; a DRL position for producing a daytime running light (DRL) mode; a low beam position for producing the low beam mode; and an intermediate glare-free high beam position for producing a glare free high beam mode.

The headlamp wherein the at least one actuator or driver substantially simultaneously drives the first and second shutter or mask members about the common pivot axis to each of the plurality of different predetermined positions.

The headlamp wherein the common pivot axis is a generally horizontal pivot axis.

The headlamp wherein the at least one actuator further comprises a linear actuator and linkage adapted to cause the first and second shutter or mask members to pivot in response to linear movement of at least a portion of the linkage.

The headlamp wherein the at least one actuator further comprises a bending actuator for pivoting the reflector and the first and second shutter or mask members about a generally vertical axis to facilitate providing a bending light function.

The headlamp wherein the at least one actuator further comprises a bending actuator for pivoting the reflector and the first and second shutter or mask members about a generally vertical axis to facilitate providing a bending light function.

The headlamp wherein the headlamp further comprises a gimbal having a gimbal frame coupled to a headlamp housing, the reflector, the lens and the shutter assembly being pivotally mounted inside the gimbal frame so that they can pivot about a generally horizontal axis and the bending actuator being coupled to the gimbal and pivotally driving it about a generally vertical axis.

The headlamp wherein the plurality of different light beam modes comprises at least two of the following: a low beam mode, a high beam mode, a glare free high beam mode and a daytime running light (DRL) beam mode; the at least one LED light source providing the light beam for the at least two of the plurality of different light beam modes.

The headlamp wherein the plurality of different light beam modes comprises all of the following: a low beam mode, a high beam mode, a glare free high beam mode and a daytime running light (DRL) beam mode; the at least one LED light source providing the light beam for each of the plurality of different light beam modes.

The headlamp wherein the plurality of shutter or mask members at least partially covers the lens when operated as a low beam projector.

The headlamp wherein the plurality of different light beam modes comprise at least two of the following: a low beam mode, a high beam mode, a glare free high beam mode and a daytime running light (DRL) beam mode.

The headlamp wherein the plurality of shutter or mask members comprises a first shutter or mask member and a second shutter or mask member, the headlamp further comprises at least one actuator or driver drivingly coupled to the first and second shutter or mask members and adapted to drive them to a plurality of different positions to produce the plurality of different light beam modes, respectively, using the same LED light source during each of the plurality of different light beam modes.

The headlamp wherein the at least one actuator or driver substantially simultaneously drives the first and second shutter or mask members about a common pivot axis to each of the plurality of different predetermined positions.

The headlamp wherein the common pivot axis is a generally horizontal pivot axis.

The headlamp wherein each of the first shutter or mask member and the second shutter or mask member comprises a portion that lies in a generally spherical plane.

The headlamp wherein each of the first shutter or mask members comprises a first end, a second end and an intermediate portion coupling the first and second ends, the intermediate portion being generally arcuate, the intermediate portion of the first shutter or mask member having an first edge that cooperates with a first edge of the second shutter or mask member to define a headlamp opening through which the light beam is projected, the at least one actuator pivotally driving the first edge of the first shutter or mask member and the first edge of the second shutter or mask member about the pivot axis towards and away from each other in order to generate each of the plurality of different lighting beam modes.

The headlamp wherein the plurality of shutter or mask portions at least partially covers the lens when operated as a low beam projector.

The headlamp wherein the headlamp comprises a spreader lens comprising a plurality of predetermined positions.

These and other objects and advantages of the invention will be apparent from the following description, the accompanying drawings and the appended claims.

BRIEF DESCRIPTION OF THE ACCOMPANYING DRAWINGS

FIGS. 1-4 are various perspective views of a headlamp assembly according to one embodiment of the invention, showing a plurality of shutters or masks in various positions to selectively occlude light to provide a plurality of different light beam mode functions;

FIGS. 5A-5D are front views of the headlamp assembly shown in FIGS. 1-4;

FIGS. 6A-6D are sectional views of the headlamp illustrating various features when the shutters are in the various plurality of different positions;

FIGS. 7A-7D are front views of the headlamp slightly enlarged to illustrate various features of the headlamp but without any gimbal;

FIG. 8 is a plan or top view of the headlamp assembly showing a drive system on a left-side (as viewed in FIG. 8) of the headlamp;

FIG. 9 is an exploded view of the headlamp assembly shown in FIGS. 1-4;

FIG. 10 is an enlarged view showing the drive system including a solenoid or actuator arm and various link arms that cooperate to drive the plurality of shutter or mask members to the plurality of different positions in order to provide the plurality of different light beam modes;

DETAILED DESCRIPTION OF THE PREFERRED EMBODIMENTS

Figure 1:
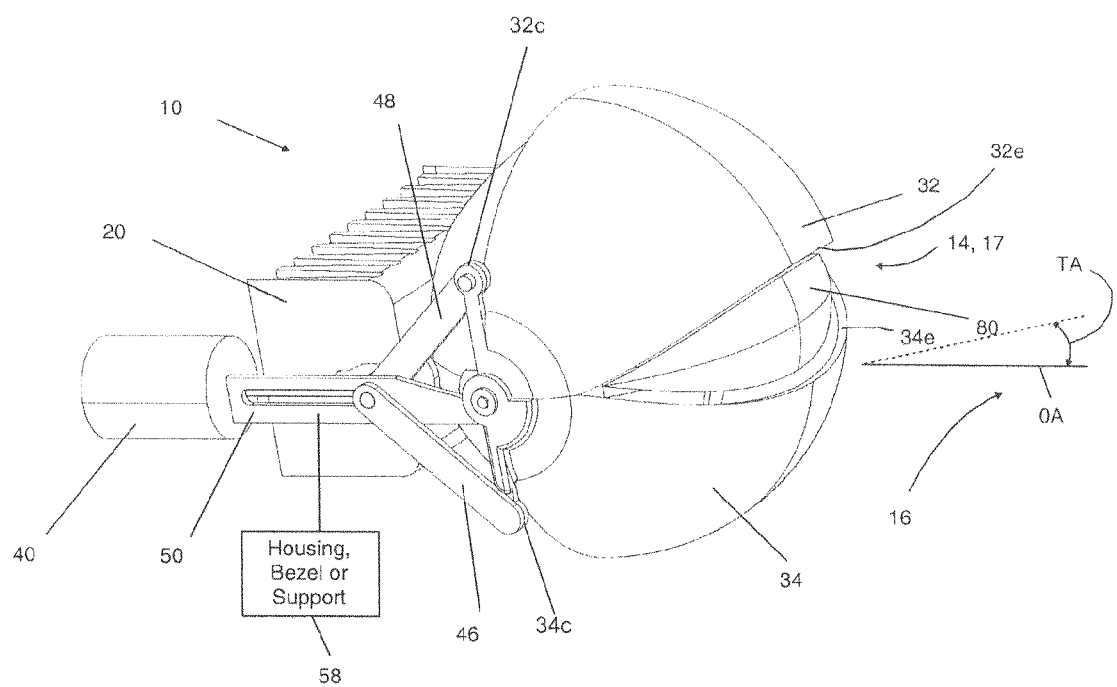

Referring now to FIGS. 1-13, an embodiment of a multifunctional LED headlamp 10 is shown. In the illustration being described, the headlamp 10 is evocative of an eyeball and consequently referred to as an "eyeball lamp". The headlamp 10 comprises a plurality of components, including a reflector 12 having a reflective inner wall or inner surface 12a that defines a cavity 14 with an open end 12b (FIGS. 2 and 9) that faces a field 16 to be illuminated. The reflector 12 comprises a focus F (FIG. 6A) at which at least one LED light source 18 (FIG. 9) comprising at least one LED is positioned. Unlike devices and headlamp assemblies of the prior art, which required different or multiple light sources to perform the various lighting mode functions, the headlamp 10 utilizes at least one LED light source 18 to perform a plurality of different light beam modes as will be described herein. The inventors have found that this substantially reduces the overall cost of the headlamp 10 in that it utilizes the single light source 18 to perform substantially all the different lighting mode functions. The apparatus allows the use of just one LED light source 18. The LED light source 18 can be one high power LED or a LED array.

The headlamp 10 further includes a heat sink 20 and an electronic drive system 19 (FIG. 9) to be used for multiple headlamp functions, for example, daytime running lights (DRL), low beam, glare-free high beam and high beam. In this example, the at least one light source 18 comprises a typical 1000 plus lumen source, which is comparatively inexpensive, currently approximately $30 (US). By using a linear adjuster, for example, a stepper motor system costing about $5 (US), this headlamp arrangement provides at least four functions from the single LED light source 18, thus reducing part complexity and cost. Thus, separate LED light sources are not required for each of the low beam, high beam, and daytime running light (DRL) functions.

It is believed that a typical current cost of the disclosed three-function (low beam, high beam and DRL) headlamp could be about $65 (US), consisting of $20 (US) in plastic components, housing, lens and bezel; $30 (US) for the LED device; $5 (US) for a plastic multi-function optic; $5 (US) for linear adjuster or driver; and $5 (US) for assorted other components. In contrast, a conventional prior art headlamp with separate LED light sources each dedicated to a single, specific function of the three functions could cost about twice as much, on the order of $130 (US), consisting of $20 (US) for plastic components, housing, lens and bezel; $30 (US) for an LED device for low beam; $5 (US) for an low beam optic; another $30 (US) for a LED device for high beam; another $5 (US) for an high beam optic; $30 for an LED DRL light source; another $5 (US) for a DRL optic; and $5 (US) for assorted other components. Thus, the manufacturing and assembly costs of the headlamp 10 is less than the devices of the prior art.

The headlamp 10 may be used alone or in combination with one or more of the features of the headlamp shown in U.S. Pat. No. 7,731,401, which is incorporated herein by reference and made a part hereof.

Referring back to FIGS. 1-9, note that the headlamp 10 comprises the heat sink 20 having a printed circuit board 22 (FIG. 9), which is at least partly reflective and that provides the LED light source 18 mounted thereon or fixed thereto, for dissipating heat generated by the at least one light source 18. In the illustration being described, the heat sink 20 is conventionally mounted or screwed to an outside surface 12d1 (FIG. 12A) of the wall 12d of the reflector 12 and the lens 26 is mounted to the wall 12d. As mentioned earlier, the light source 18 could be a high power LED or an LED array. Note that the reflector 12 comprises an inner wall 12c (FIGS. 6A and 12D) defining an aperture 24. As mentioned earlier, the LED light source 18 is situated at substantially the focus F (FIG. 6B) of the reflector 12.

The headlamp 10 further comprises at least one lens 26 that is detachably mounted to a rear wall 12d of reflector 12. In the illustration being described, the lens 26 is an inner spread lens that facilitates spreading the light emitted by the at least one light source 18. In the illustration being described, the lens 26 is integrally formed and comprises a pair of legs or projections 26a and 26b (FIGS. 12G-12I) having integrally formed detents 26a1 and 26b1 (FIGS. 12G and 12H) which are detachably received in mating apertures 12e and 12f (FIG. 12D) in the wall 12d of the reflector 12. In the illustration being described, the lens 26 is spaced from the wall 12d as best illustrated in FIGS. 6A-6D. Thus, note that the lens 26 is intermediate or between the wall 12d of reflector 12 and the field 16 to be illuminated. It is important to understand that the lens 26 is adapted to receive at least some of the light rays emitted by the at least one light source 18 and emit them toward the field 16 to be illuminated. In one embodiment, the lens 26 does not receive all light rays, especially those that are reflected off of the inner surface 12a of the reflector 12. Other lenses, such as a spreader lens 80 (FIG. 6A) described later herein may also be used.

The headlamp 10 further comprises a shutter or mask assembly 30 having a plurality of shutters or mask members that are adapted to be moved to a plurality of different predetermined positions so that they can cooperate to occlude or mask at least a portion of the light rays generated by the at least one light source 18 in order to produce a plurality of predetermined light beam modes, respectively, that are projected toward the field 16 to be illuminated. The plurality of different predetermined positions and their respective plurality of different light beam modes will be described later herein.

In the illustration being described, the shutter assembly 30 comprises a first or upper shutter or mask member 32 and a second or lower shutter or mask member 34. The first and second shutter or mask members 32, 34 comprise at least a portion that lies in a generally spherical plane and are generally arcuately shaped about both the longitudinal axis LA (FIGS. 12J-12M) as well as in a radial plane that bisects or is substantially perpendicular to the longitudinal axis LA as best illustrated in FIG. 12M.

It should be appreciated that the first and second shutter or mask members 32, 34 are mirror images of each other in the illustration. For ease of description, the upper shutter or mask member 32 will be described, with it being understood that the lower shutter or mask member 34 is substantially identical, but oriented as illustrated in FIGS. 1-9. Note that the first or upper shutter or mask member 32 comprises a first connecting projection 32a and a second connecting projection 32b (FIGS. 9, 12J-12N), each having or defining an aperture 32a1 (FIG. 12J) and 32b1, respectively, for mounting onto a frame or gimbal 41 (FIG. 9) that is described later herein. The first and second shutter or mask members 32 and 34 also comprises integrally formed connector or link arms 32c, 32d, 34c, 34d. The assembly and operation of the first and second shutter or mask members 32 and 34 will be described later herein.

Note that the first and second shutter or mask members 32 and 34 comprise an edge 32e and 34e, respectively, that cooperate to form a cavity, window or opening 17 (FIG. 1) whose size can vary by moving the edges 32e and 34e towards and away from each other in response to pivoting or moving the first and second shutter or mask members 32 or 34, respectively. This, in turn, alters the shape, size and intensity of the beam projecting from the headlamp 10 in order to provide the plurality of different light beam modes as described herein. The first and second shutter or mask members 32 and 34 cooperate to occlude or mask light reflected by the reflector 12 or projected by the at least one light source through the lens 26. Various details of the reflector 12 and occlusion and luminosity diagrams relative to the various parts of the reflector 12 are described later herein relative to FIGS. 11A-11C.

Referring back to FIG. 9, note that the headlamp 10 comprises the drive system 19 having at least one actuator or driver 40 that is coupled to the first and second shutter or mask members 32 and 34 and adapted to drive the first and second shutter or mask members 32 and 34 to and between an open position (illustrated in FIG. 2A) and a substantially closed position (illustrated in FIG. 1), as well as to the plurality of different predetermined positions so that they can cooperate to occlude or mask at least a portion of the light rays emitted by the at least one light source 18 to produce the plurality of different light beam patterns or modes. For ease of illustration, the various connectors or arms 46, 48 and 50 are shown only connected to one side of the headlamp assembly 10, namely the side closest to the viewer as viewed in FIGS. 1-4, but it should be understood that similar linkage may be provided on the opposite side (as illustrated in FIG. 8) in order to pivotally secure the reflector 12 and first and second shutter or mask members 32 and 34 to the gimbal 41.

In the illustration being described, the drive system 19 comprises the at least one actuator or driver 40 comprising an actuator arm 42 and connector 44 and cooperating link arms 46 and 48. The driver or actuator 40 could be a conventional stepper motor under the control of a headlamp controller (not shown) that controls the operation of the headlamp 10. A guide arm 50 having a linear guide slot 52 receives a projection 46a that passes through the linear guide slot 52 and is coupled to the connector 44 and to the end 48a of the cooperating linkage arm 48 as shown in FIG. 9. The cooperating link arm 46 also comprises a male projection 46b that is received in the female opening or aperture 34c1 defined by the connector arm 34c. The cooperating link arm 48 also comprises a projection 48b that is received in the aperture 32c1 of the connector arm 32c.

It should be understood that the guide arm 50 has a first end 50a having a hollow or male projection or through-hole 50a1. It should also be understood that the guide arm 50 is stationary during operation of the headlamp 10 and is fixed or secured to a housing, bezel or other support 58 (FIG. 9) that is shown schematically for ease of illustration. The housing, bezel or support 58 could be a headlamp housing, bezel or frame for a conventional vehicle, such as an automobile or a motorcycle.

Note that the guide arm 50 comprises the hollow first end 50a that defines an aperture or through-hole 50a1 (FIG. 9) that is adapted to receive a supporting projection 12j (FIGS. 9 and 12D) from the reflector 12. The outer surface 50a2 of the first end 50a is generally cylindrical and pivotally receives the second connecting projections 32b and 34b. Consequently, the first and second shutter or mask members 32, 34, reflector 12, heat sink 20 and drive system 19 all share a common pivot axis PA about which the headlamp assembly 10 and the plurality of shutter or mask members, such as the first and second shutter or mask members 32 and 34, may pivot. The first end 50a is received in the apertures 32b1 and 34b1 of the second connecting projections 32b and 34b and received in an aperture 41b1 of a male projection 41b (FIG. 12O) of the gimbal 41.

It should be understood that the first and second shutter or mask members 32 and 34 and the reflector 12 are pivotally mounted about a pivot axis PA (FIG. 4) in the gimbal 41. The actuator 40 linearly drives the link arms 46 and 48 to cause the first and second shutter or mask members 32 and 34 to pivotally move about the axis PA to the plurality of predetermined different positions, such as the open position illustrated in FIG. 2 and the substantially closed position shown in FIG. 1. In this regard, the actuator 40 actuates the actuator arm 42 and link arms 46 and 48 in the direction of double arrow C (FIG. 10) to drive the link arms 46 and 48 which in turn drives ends 46x and 48x, respectively, of the connector arms 32c and 34c either towards or away from each other. FIG. 10 shows the ends 46x and 48x connected to connector arms 32c and 34c, respectively, for ease of understanding. In response, the connector arms 32c and 34c are driven to the closed or open position, thereby selectively occluding or making light and simultaneously, changing a size of the opening 17 and a shape of the beam and luminous intensity. Thus, the at least one actuator and associated linkage actuator or driver 40 and the various link arms 46, 48 are adapted to drive the first and second shutter or mask members 32 and 34 so that the edges 32e and 34e move toward and away from each other to at least one of the plurality of predetermined positions which provide the plurality of predetermined light beam modes, respectively.

In the illustration being described, the plurality of different light beam modes comprises one, two or more of the following modes: a low beam mode, a high beam mode, a glare-free high beam mode and a daytime running light (DRL) beam mode. The plurality of predetermined positions comprise:

a fully open position for producing the high beam wherein the first and second shutter or mask members 32 and 34 are pivotally driven a first predetermined number of degrees to a fully open position;

a DRL position for producing the daytime running light (DRL);

a low beam position for producing the low beam; and an intermediate glare-free high beam position for producing the glare free high beam.

The positions of the first and second shutter or mask members 32 and 34 and the various light beam modes created will now be described. FIGS. 1, 5A, 6A and 7A illustrate the first and second shutter or mask members 32 and 34 being in a substantially fully closed or DRL position. It should be understood that, except for the high beam mode, the first and second shutter or mask members 32 and 34 mask or occlude the light generated by the at least one light source 18, regardless of whether that light has passed through the lens 26. In the illustration being described, when the first and second shutter or mask members 32 and 34 have been driven to the DRL position shown in these figures, the daytime running light mode is produced. During this mode, approximately 30 percent of the light generated by the at least one light source 18 is permitted out of the headlamp 10. During this DRL mode, the first and second shutter or mask members 32 and 34 are open a predetermined angles θ and φ (FIG. 6A), respectively, of only about 30 degrees and the reflector 12 is tilted upward approximately 2 degrees. The means and apparatus for tilting will now be described.

It may also be desirable to provide some tilting movement of the headlamp 10 during some modes of operation. For example, in some modes it may be desirable to tilt the reflector 12 downward which causes the entire light beam pattern to tilt downward a corresponding number of degrees, while in other modes, such as high beam and DRL modes, it may be desirable to tilt the reflector 12 upwards. In one embodiment, the headlamp 10 further comprises a linear adjustment tilting mechanism or pivot member 70 (best illustrated in FIGS. 9, 12E and 12F) that is mounted on or integral with the heat sink 20 as shown. In the illustration being described, the pivot member 70 provides for pivoting or tilting movement of the reflector 12 a predetermined angle (TA) relative to an optical axis (OA) in FIG. 6B for at least one or more of the plurality of different light beam modes. In this illustration, the tilting movement is synchronized with the movement of the first and second shutter or mask members 32 and 34 and occurs substantially simultaneously during the movement of the plurality of shutter or mask members, such as the first and second shutter or mask members 32 and 34, when they are moved to the plurality of different predetermined positions. In the illustration being described, the pivot member 70 comprises a wall 71 (FIG. 9) having a machined or formed slot 72 that provides a camming surface and slot. The camming slot 72 receives an end 46a1 of the pin or projection 46a as best illustrated in FIGS. 9 and 10. Notice that when the end 46a1 of the pin or projection 46a rides in the slot 72, the heat sink 20 is responsive thereto and moves in the direction of double arrow C (FIG. 10) which in turn causes tilting movement of the heat sink 20, reflector 12 and the first and second shutter or mask members 32 and 34 and optical axis OA of the headlamp 10 in the direction of the double arrow D in FIG. 2. In response, this causes a vertical pivoting of the headlamp 10 within the gimbal 41. In the illustration being described, the track or camming slot 72 provides about plus 2 degrees of tilting movement, but it also could be formed or shaped to provide, for example, minus 2 degrees during some modes.

In the illustration being described, the reflector 12 is level (i.e., optical axis OA is about zero (0) degrees) during a low beam mode described later herein and 2° tilted up during a high beam mode and daytime running light (DRL) mode.

It should be understood that the tilting or pivoting movement is substantially simultaneous with the opening and closing of the first and second shutter or mask members 32 and 34 because they are linked together and pivot about the same common axis PA. The projection 46a, which couples the connector 44 to the end 48a of the arm 48, has the end 46a1 that is received in the camming slot 72 and acts as a follower responsive to the linear movement of the heat sink 20 so that as the end 46a1 moves in the slot 72, as a result of the driver 40 actuating the link arms 46 and 48 to or between the open and closed positions described herein, the heat sink 20, reflector 12 and first and second shutter or mask members 32 and 34 move responsively to the tilted position dictated by the slot. Table 1 mentioned later herein defines the various tilted angles TA in the illustration being described for each of the plurality of light beam modes. It should be understood, however, that these angles are merely representative and the tilting angle TA could be greater or smaller if desired. For example, the slot 72 could provide angular movement of greater than two degrees. While the embodiments described herein show a tilting movement that causes the optical axis OA to be tilted upward (for example, in the high beam mode of operation) it should be understood that the camming slot 72 could be defined to provide a downward tilting movement, for example, for a low beam mode of operation.

Figure 2:
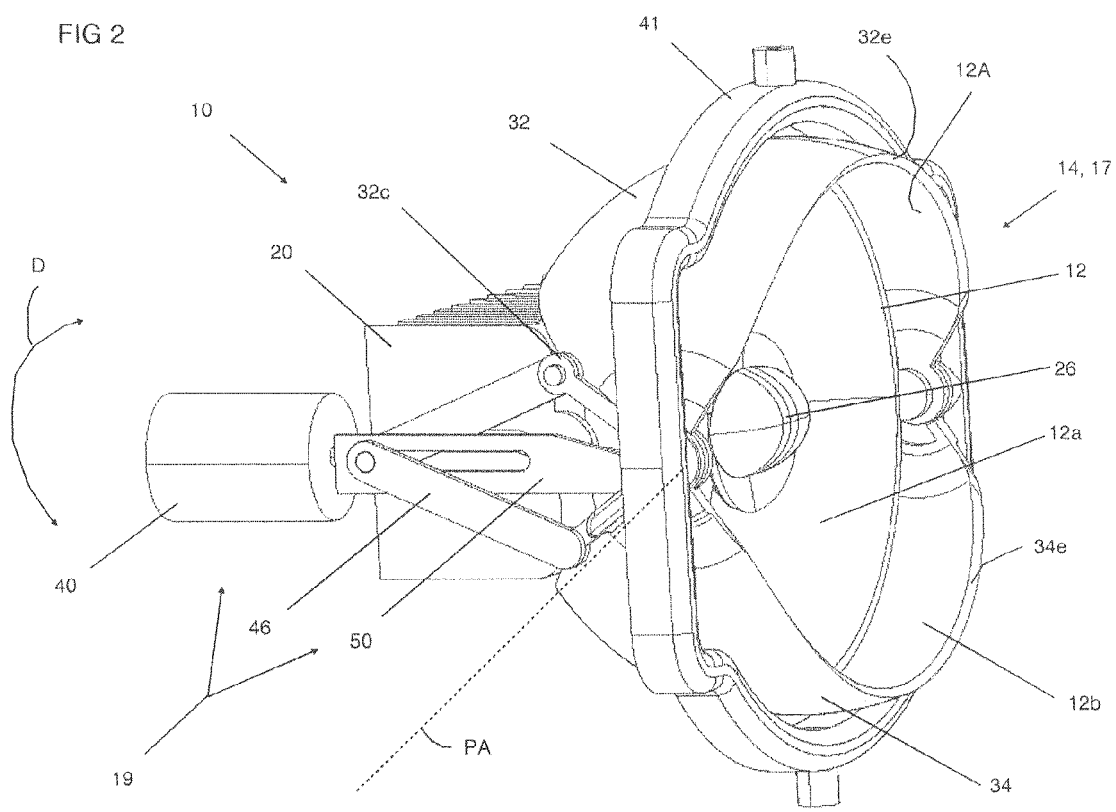
Figure 3:
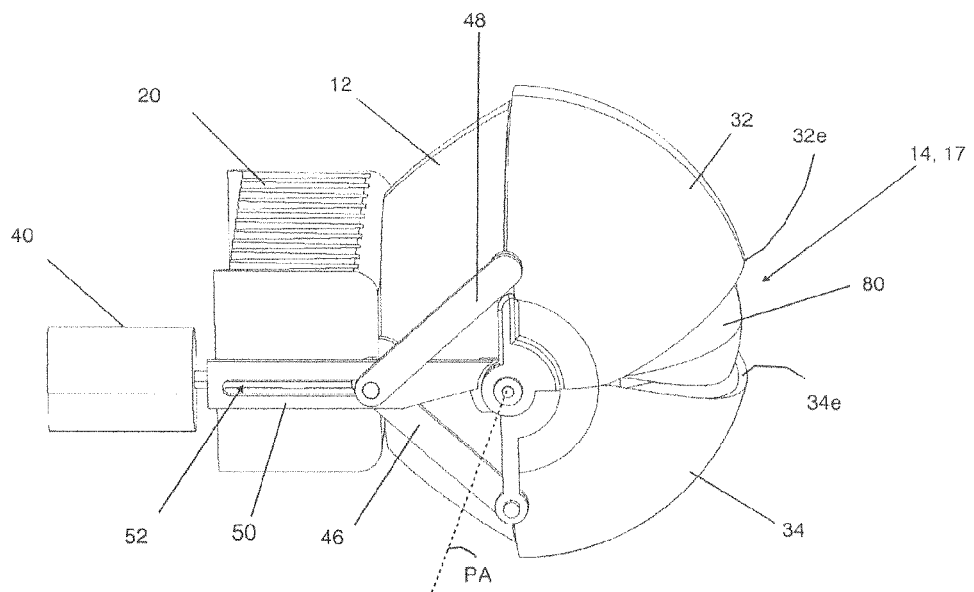

Referring now to FIGS. 1 and 5A, note that in the substantially closed position, the headlamp 10 and the at least one actuator or driver 40 and associated link arms 46 and 48 causes the first and second shutter or mask members 32 and 34 to assume the positions shown in FIGS. 1, 5A, 6A and 7A. In this regard, the at least one actuator or driver 40 actuates the link arm ends or projections 46a and 48a to a fully extended position as illustrated in FIG. 1. Regarding tilting, the pin or end 46a1 rides in the camming slot 72 to cause the reflector 12 to tilt a tilting angle TA (FIG. 6A) of about plus 2 degrees as a result of the end 46a1 becoming situated in the area 72a (FIGS. 7A and 12F) of the camming slot 72.

Figure 6C:
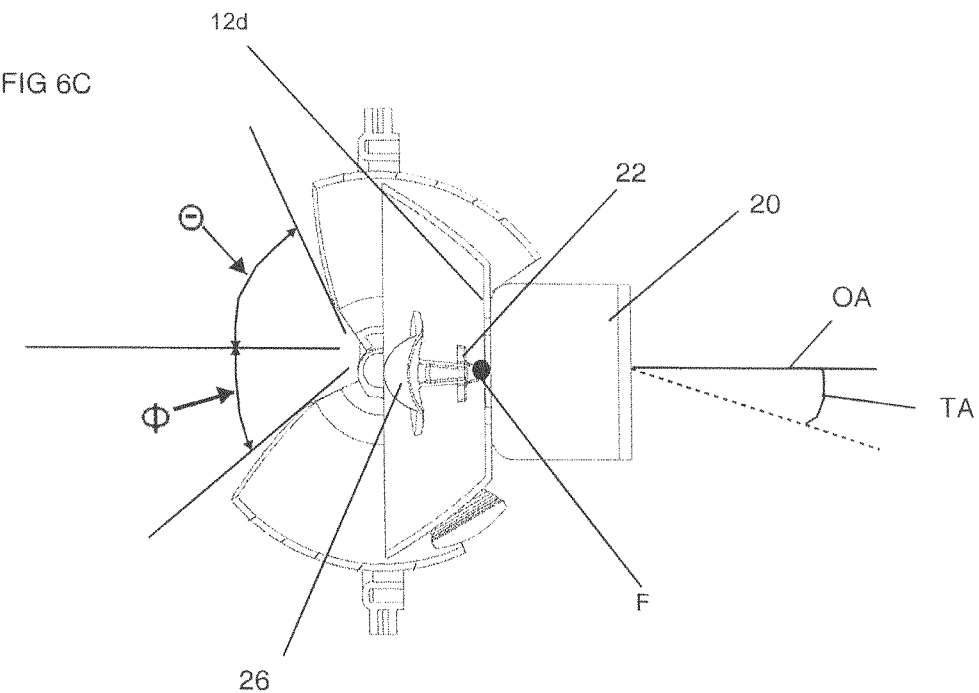

As best illustrated in FIG. 6A, note that in the daytime running lamp mode, it may be desirable to provide an additional spreader lens during the DRL mode for spreading the light from the headlamp 10. The spreader lens 80 (FIGS. 6A and 7A) may be pivotally mounted to the reflector 12 as best illustrated in FIGS. 6A and 7A. When not in the DRL mode, the spreader lens 80 is pivotally moved away from the optical axis OA (FIG. 6B) of the headlamp assembly 10, for example, to the positions shown in FIGS. 6B-6D and covered by either the first or second shutter or mask members 32 or 34. In the illustration being described, the spreader lens 80 facilitates spreading the light received from the lens 26 or from the reflector 12.

FIGS. 2, 4, 5D, 6D and 7D illustrate the first and second shutter or mask members 32 and 34 driven by the actuator 40 to a fully open position which causes the headlamp 10 to generate the high beam during a high beam mode function. Note that no light from light source 18 is occluded or masked. During this mode, the first shutter or mask member 32 is open the angle θ of about 45 degrees and the bottom or second shutter or mask member 34 is also open the angle φ of about 45 degrees. During this mode of operation, approximately 100% of the light generated by the at least one light source 18 is emitted from the headlamp 10 and the tilt angle TA is about plus 2 degrees.

FIGS. 5B, 6B and 7B show the first and second shutters or mask members 32 and 34 driven to the low beam mode position during which the headlamp 10 generates a low beam using the single at least one light source 18. In this regard, note that both of first and second shutter or mask members 32 and 34 are each open the predetermined angles θ and φ of approximately 30 degrees. During this mode of operation, approximately 70% of the light generated by the at least one light source 18 passes through the opening 17 to provide or generate the low beam function. Note that during this mode, the actuator 40 has driven the linkage approximately half way or midway in the camming slot 72 which causes the headlamp 10, reflector 12 and first and second shutter or mask members 32 and 34 not to be tilted, but rather to assume a tilt angle TA (FIG. 6B) of 0 degrees. In other words, the system would be tilted the 2 degrees with the level that is located in the middle of the slot on the heat sink 20. The section of the opening 17 that is higher than the end causes the entire headlamp 10 to tilt down the 2 degrees.

Still another position of the first and second shutter or mask members 32 and 34 is illustrated in FIGS. 5C, 6C and 7C wherein the second actuator or driver 60 (FIG. 7C) and linkage drives the first and second shutter or mask members 32 and 34 to the position shown in FIGS. 5C, 6C and 7C. In this position, note that the upper or first shutter or mask member 32 is in the fully open position the angle θ of approximately 45 degrees. In contrast, note that the lower second shutter or mask member 34 is open an angle φ of about 30 degrees. The headlamp 10 is not tilted in this mode. This results in a masking or cutting off of a portion of the beams that would normally be reflected upward and generate a portion of the high beam. This mode is referred to as a "glare-free" high beam mode.

As mentioned earlier, the link arms 46, 48 and 50 are shown linking the connector arms 32c and 34c on only one side or end of the first and second shutter or mask members 32 and 34, but a second linkage and actuator 60 (FIGS. 7B-7D) could be provided on the other end or side of the first and second shutter or mask members 32, 34, as illustrated in FIG. 8. It should be understood that the opposing side and the first connecting projections 32a and 34a could also comprise cross linkage (not shown) to connect that linkage to the actuator 40, or alternatively, the linkage could be driven by a separate actuator or driver 60 (FIG. 7C).

Referring back to FIG. 2, note that the gimbal 41 may be coupled to a driver or actuator 64 (FIG. 7A) for pivotally driving the gimbal 41 about a second pivot axis PA2 (FIGS. 7A and 9) to cause the gimbal 41 and the headlamp 10 to pivotally move in the direction of double arrow B in FIG. 7A. Advantageously, this provides a swiveling left and right function which is desirable for dynamic bending light functions and adaptive steering lighting ("AFS") and glare-free low beam lighting. The driver or actuator 64 is coupled to and under the control of the conventional CAN network (not shown) and controller (not shown) in the vehicle or headlamp which drives the driver or actuator 64 to cause the pivotal movement in a manner conventionally known.

The following Table I summarizes the first and second shutter or mask members 32 and 34 positions and associated tilt positions for each mode.

TABLE I

| Function or Mode | Top Shutter Lid 32 Position | Bottom Shutter Lid 34 Position | Reflector 12 Tilt Angle TA |
|---|---|---|---|
| DRL | Closed (small opening) | Closed (small opening) | Up 2° |
| Low Beam | Open 30° | Open 30° | 0° |
| High Beam-Glare Free | Open 45° | Open 30° | 0° |
| High Beam | Open 45° | Open 45° | Up 2° |

Figure 11A:
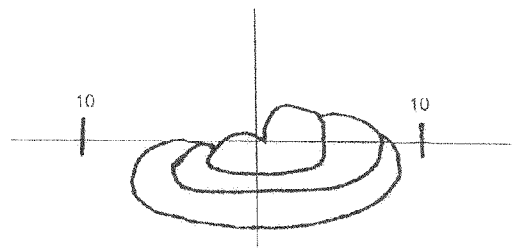
FIGS. 11A-11J are various isolux diagrams associated with the headlamp in each of the plurality of different positions.
Figure 11B:
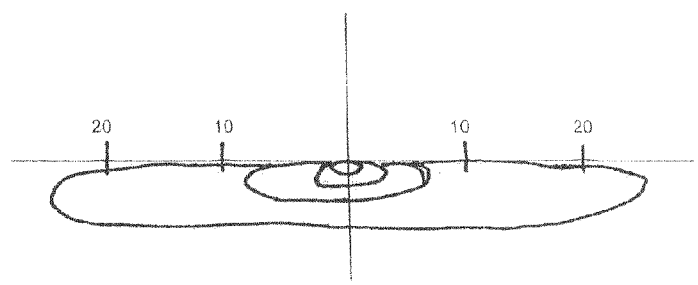
Figure 11C:
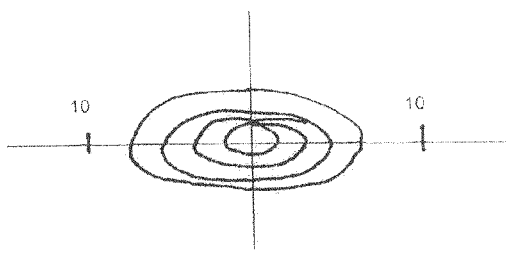
Figure 11D:
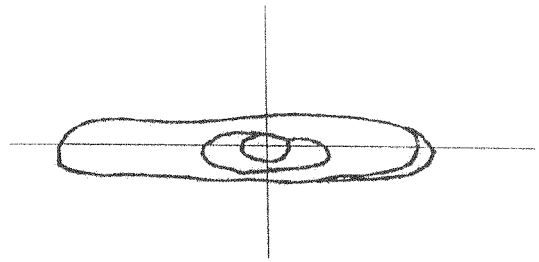
Figure 11E:
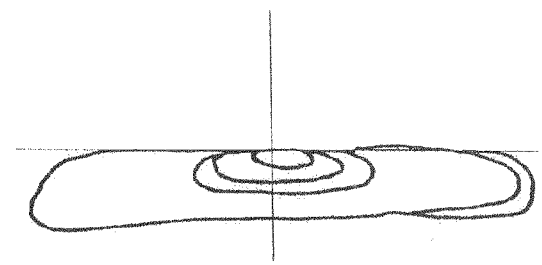
Figure 11F:
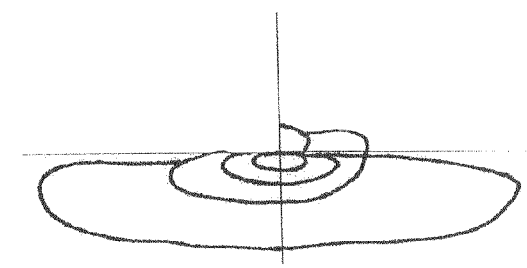
Figure 11G:
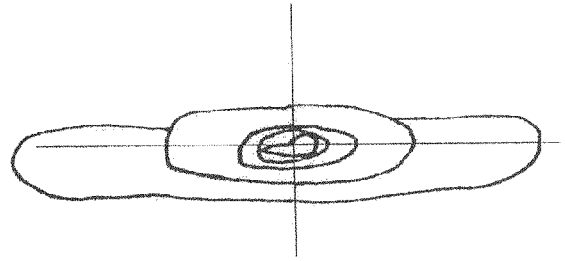
Figure 11H:
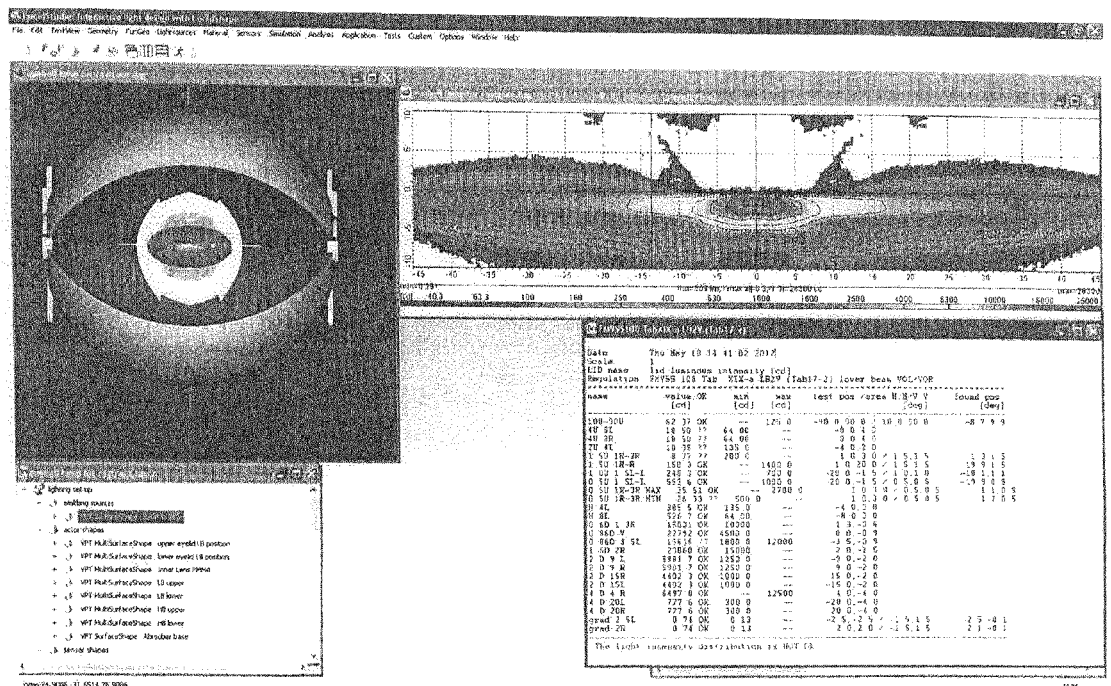
Figure 11I:
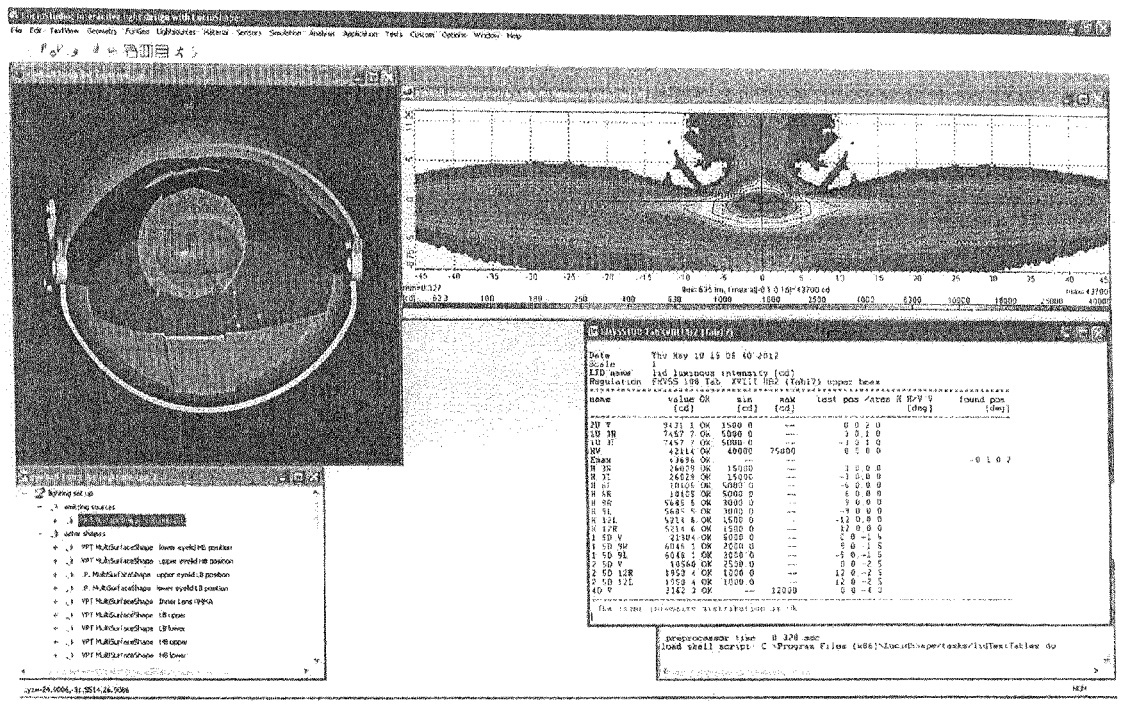
Figure 11J:
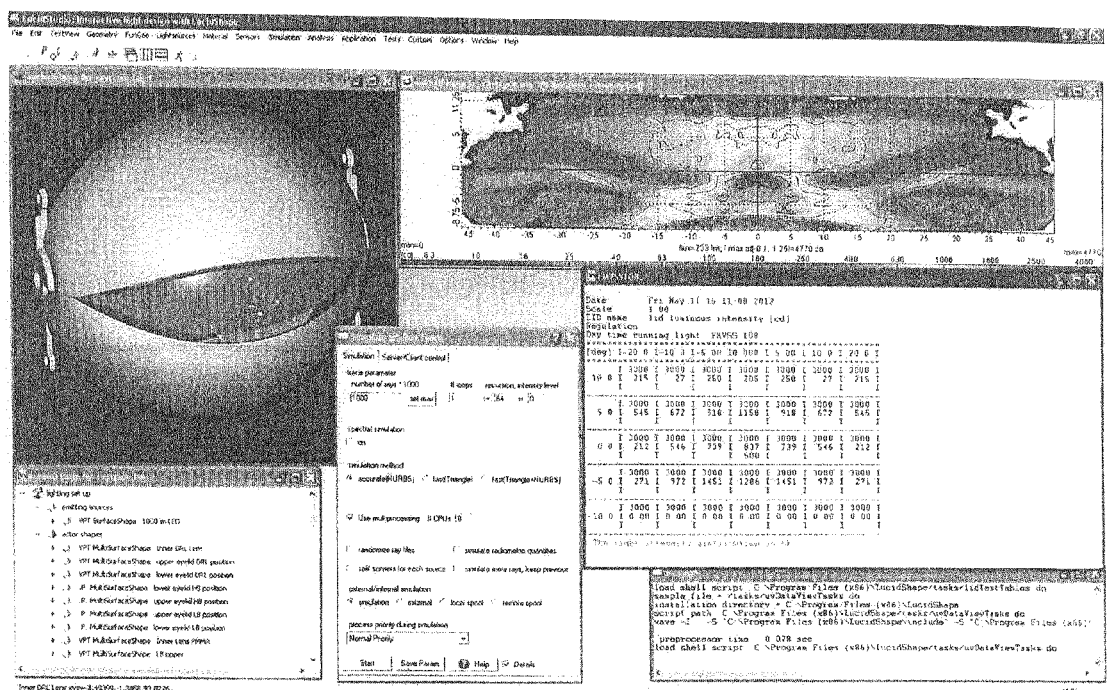
Figure 12A:
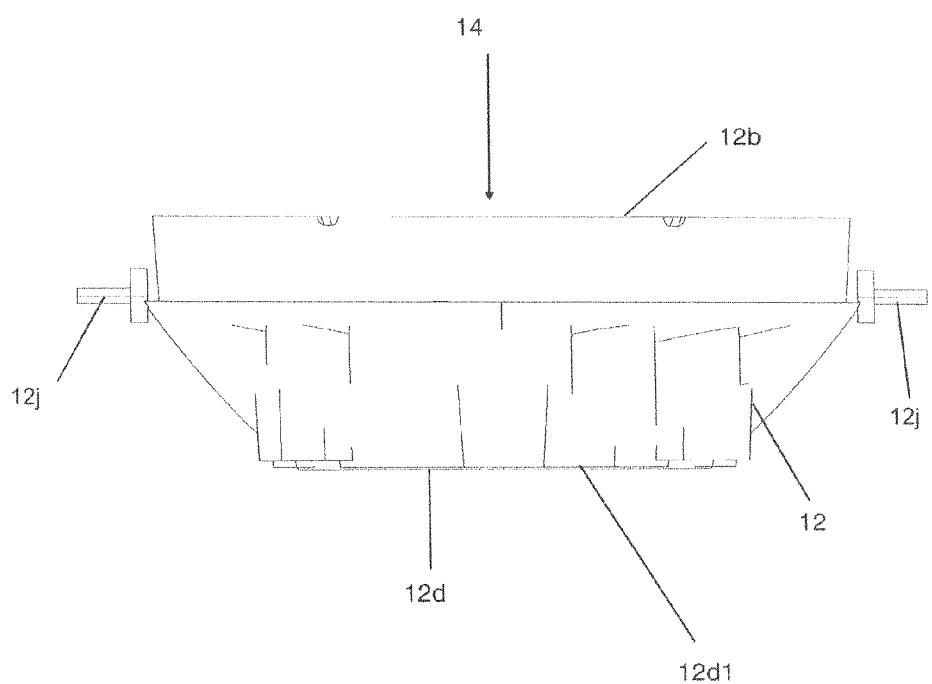
FIGS. 12A-12S illustrate the various individual components of the headlamp assembly.
Figure 12B:
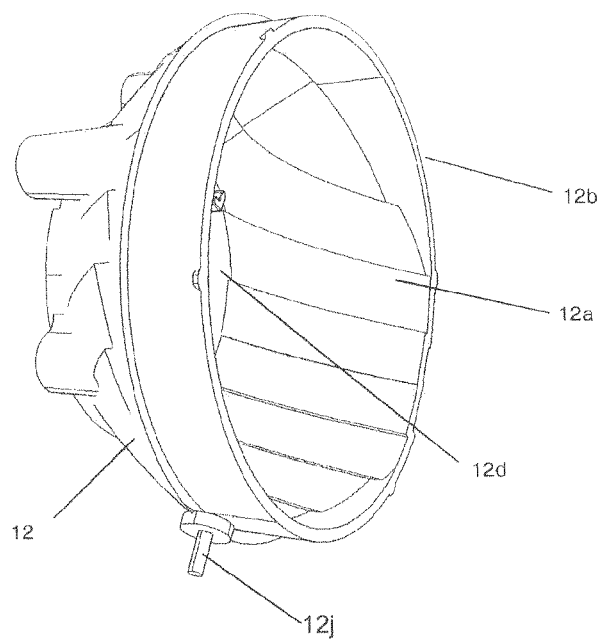
Figure 12C:
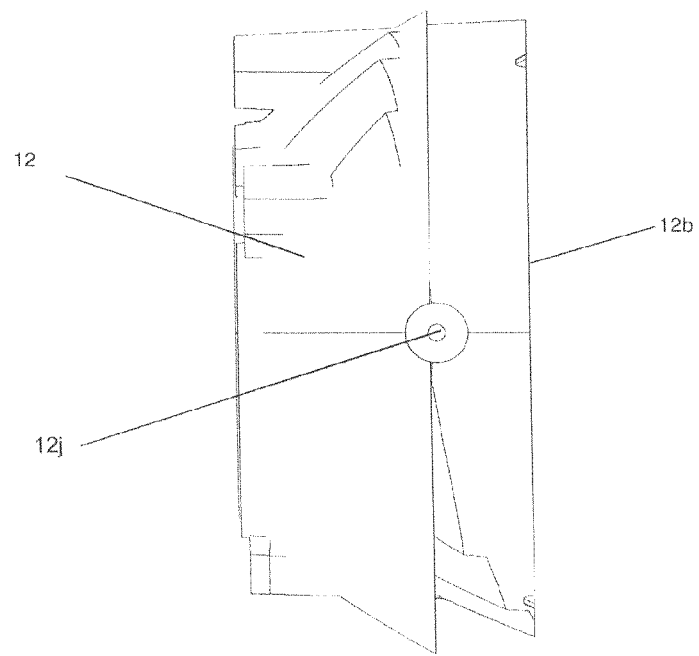
Figure 12D:
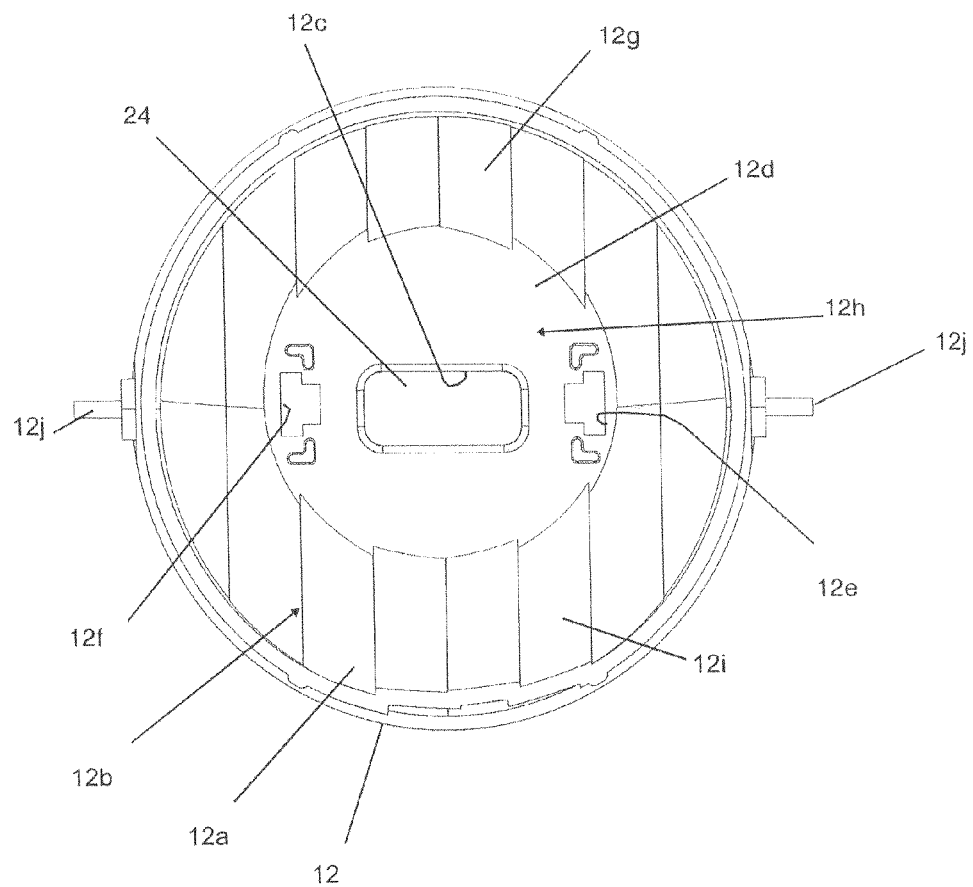
Figure 12E:
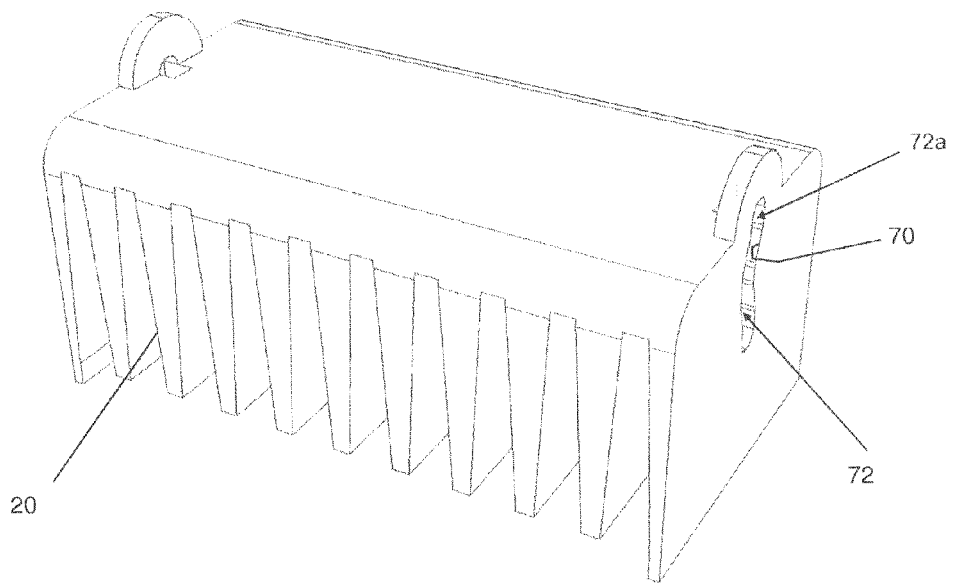
Figure 12F:
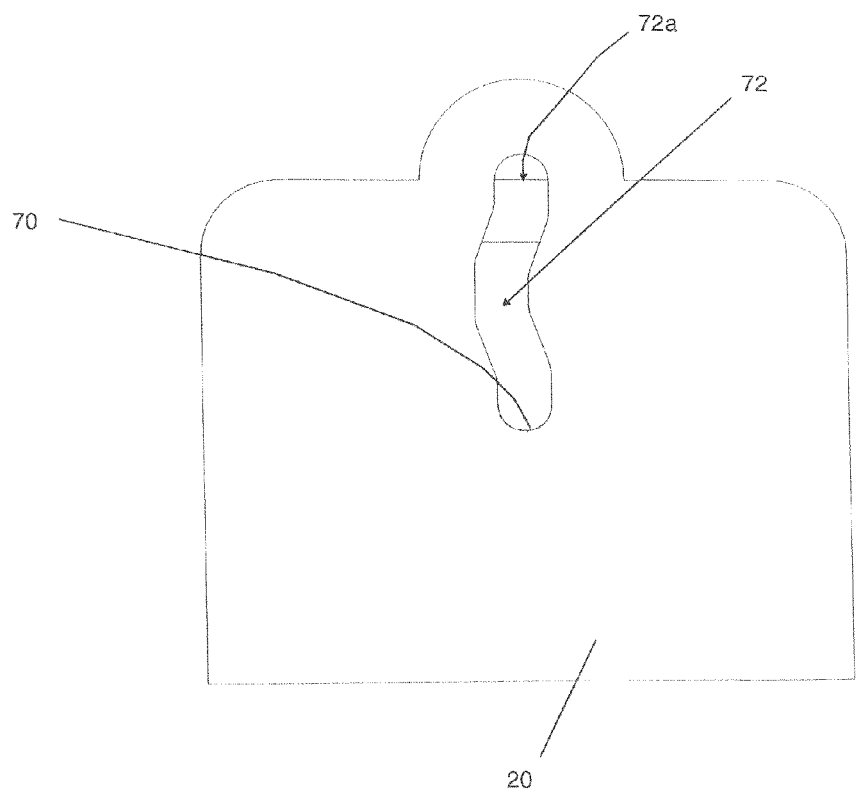
Figure 12G:
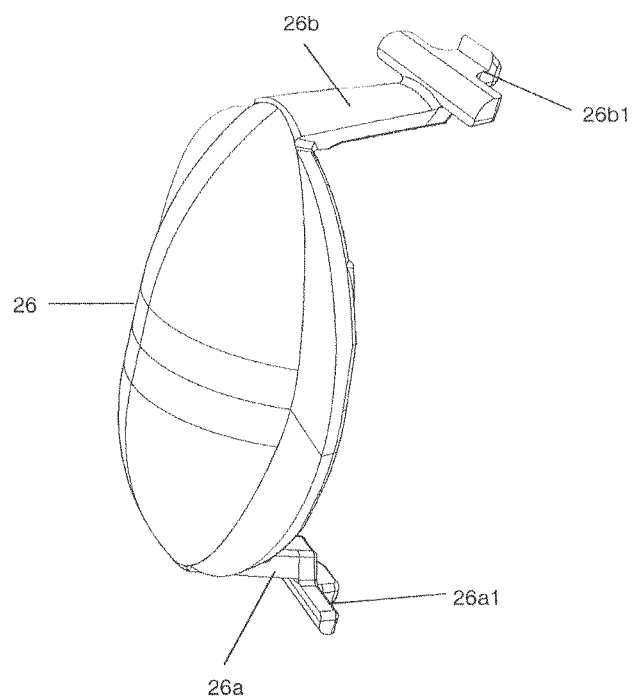
Figure 12H:
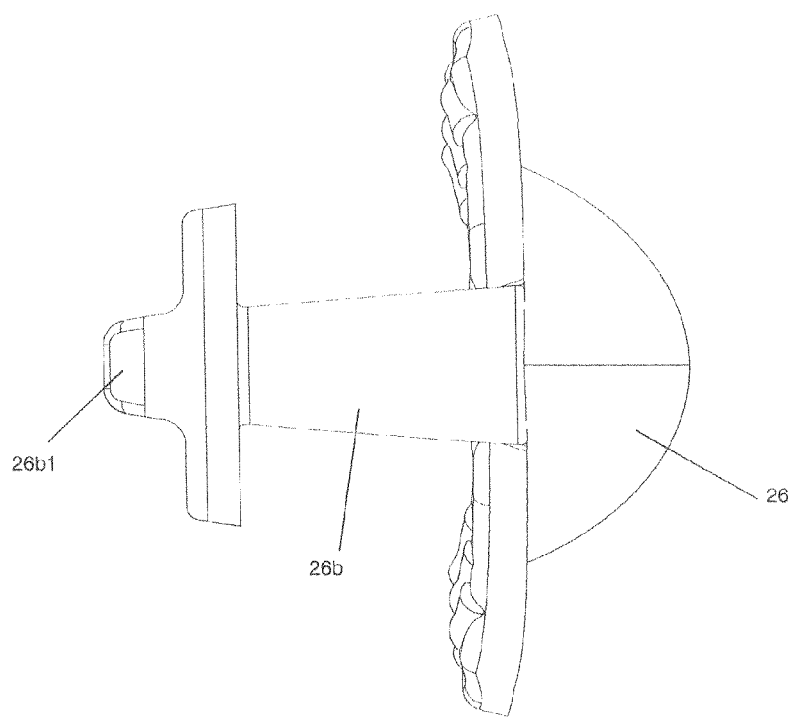
Figure 12I:
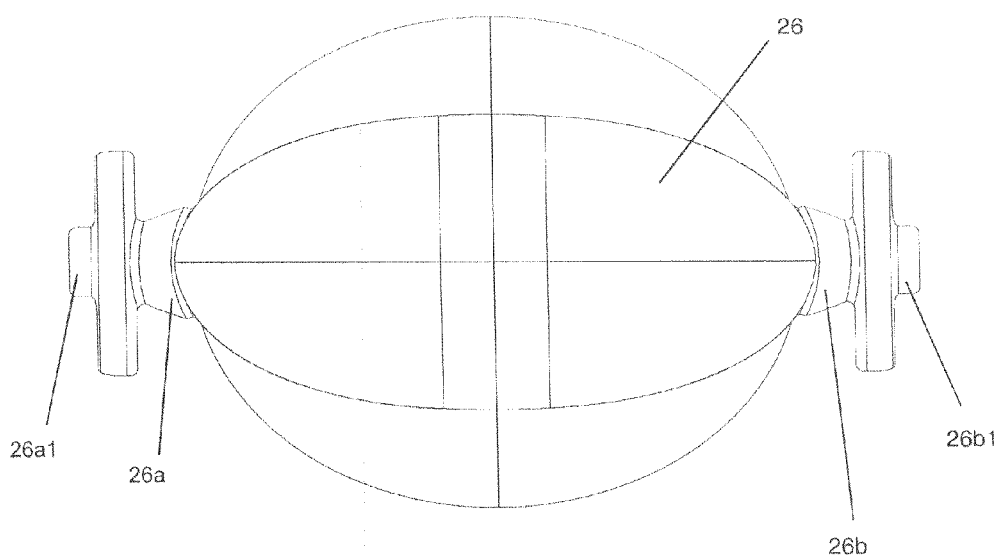
Figure 12J:
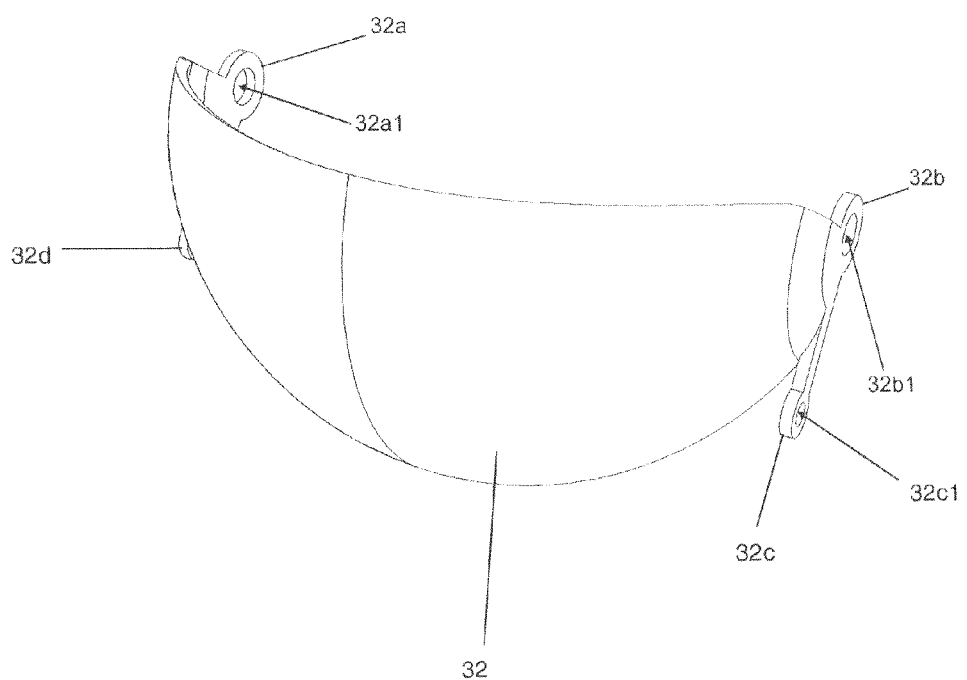
Figure 12L:
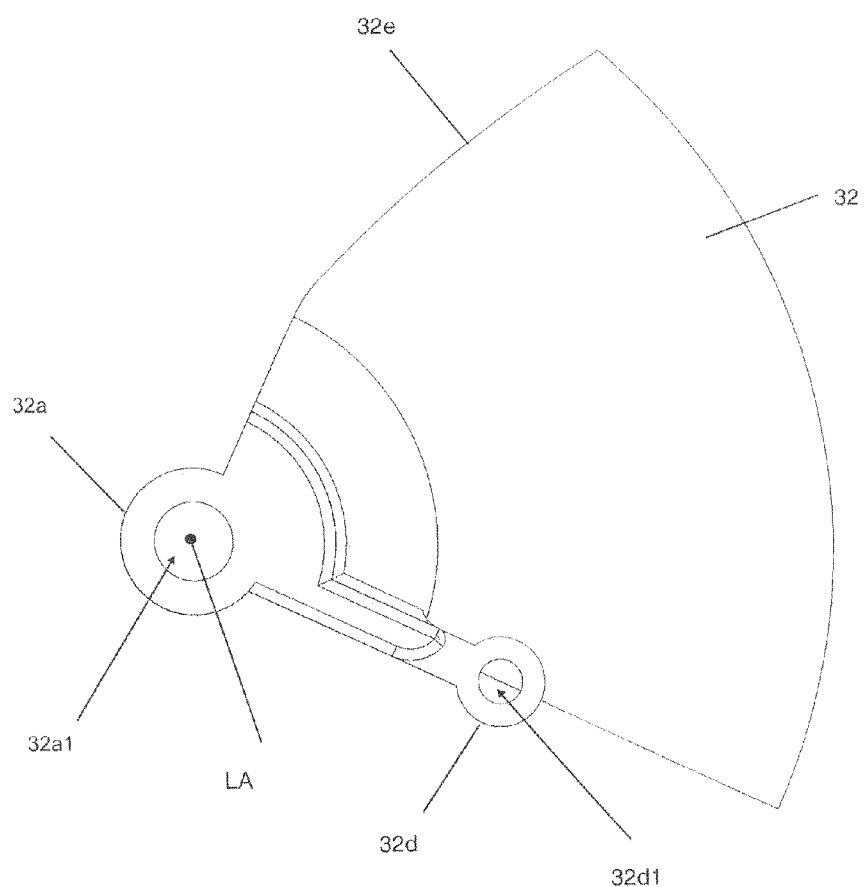
Figure 12N:
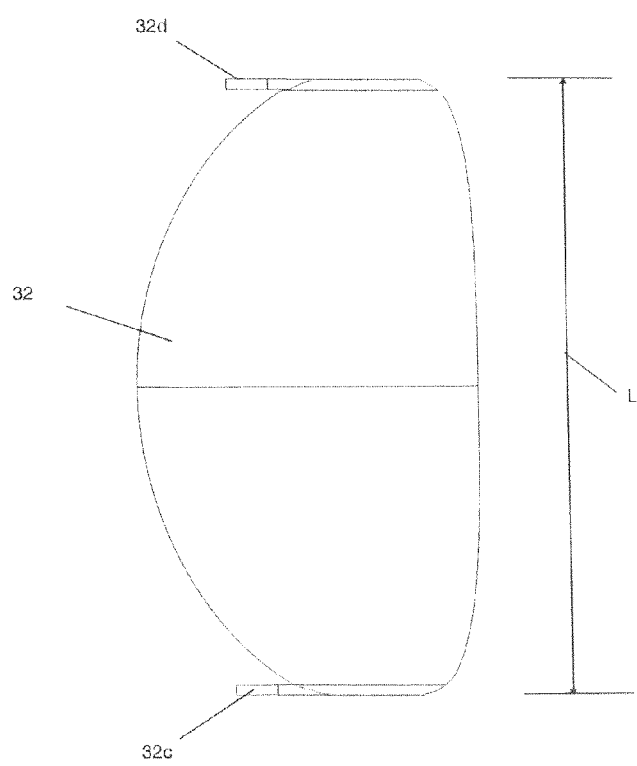
Figure 12O:
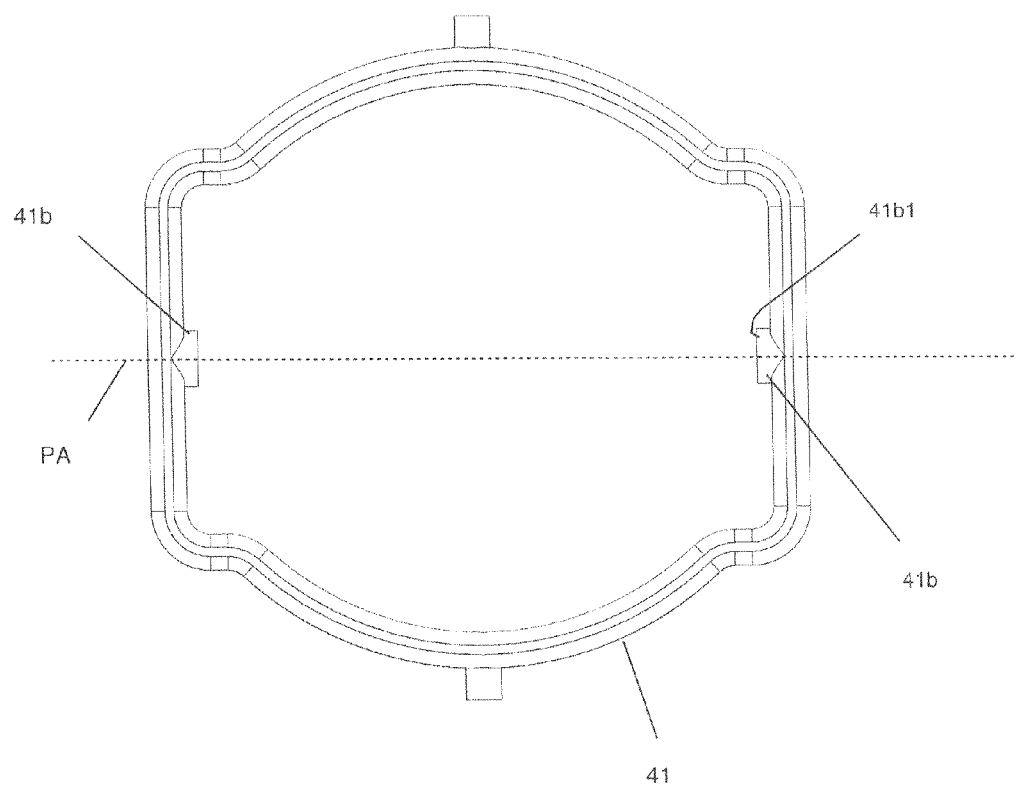
Figure 12P:
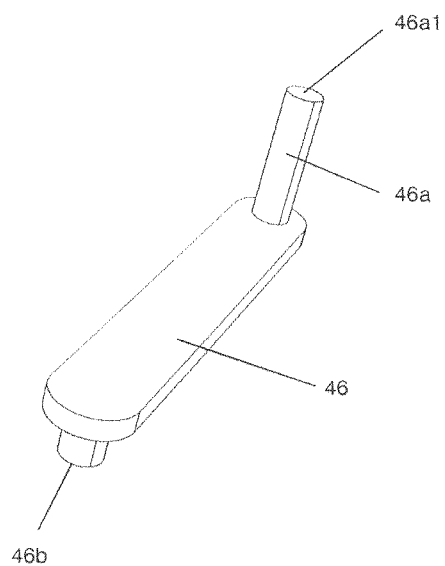
Figure 12Q:
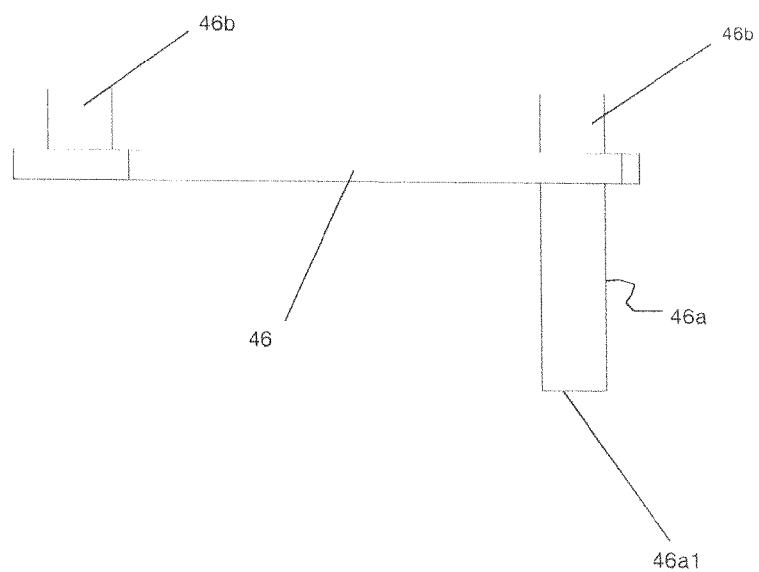
Figure 12R:
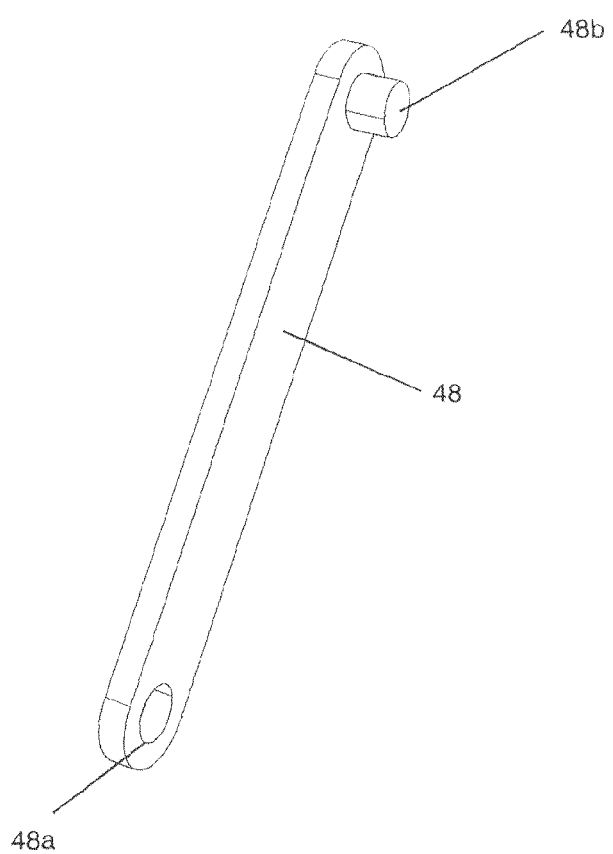
Figure 12S:
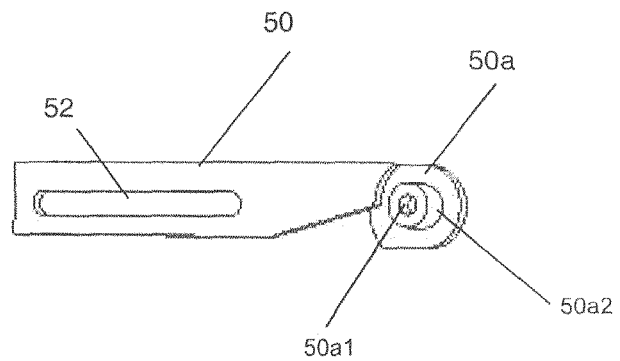

FIGS. 11A-11G are predicted isolux diagrams illustrating various features. FIG. 11D relates to the DRL mode, FIG. 11E relates to the low beam mode, FIG. 11F relates to the glare-free high beam mode and FIG. 11G relates to the high beam mode of operation. FIG. 11J is computer generated simulation data illustrating an isolux diagram showing a luminosity relative to the optical axis during the DRL mode. FIG. 11H is an isolux diagram of a low beam mode and FIG. 11I is an isolux diagram simulation for the high beam mode of operation.

Advantageously, the reflector 12 (FIG. 12D) comprises a top reflective area 12g, a bottom reflective area 12i and an intermediate area 12h coupling the top reflective area 12g and bottom reflective area 12i. It should be understood that the top reflective area 12g contributes to the glare-free high beam mode of operation and the bottom reflective area 12i contributes to the high beam mode of operation. Isolux beam pattern diagrams for top reflective area 12g, bottom reflective area 12i and intermediate area 12h are shown in FIGS. 11A, 11C and 11B (with the spreader lens 80), respectively. In the low beam mode of operation, illustrated, for example, in FIGS. 5B, 6B and 7B, the top and bottom reflective areas 12g and 12i are at least partially blocked by the first and second shutter or mask members 32 and 34, respectively, thereby blocking or occluding that portion of the light beam emitted from the at least one light source 18 that contributes to the high beam or glare-free high beam modes of operation.

Figure 6D:
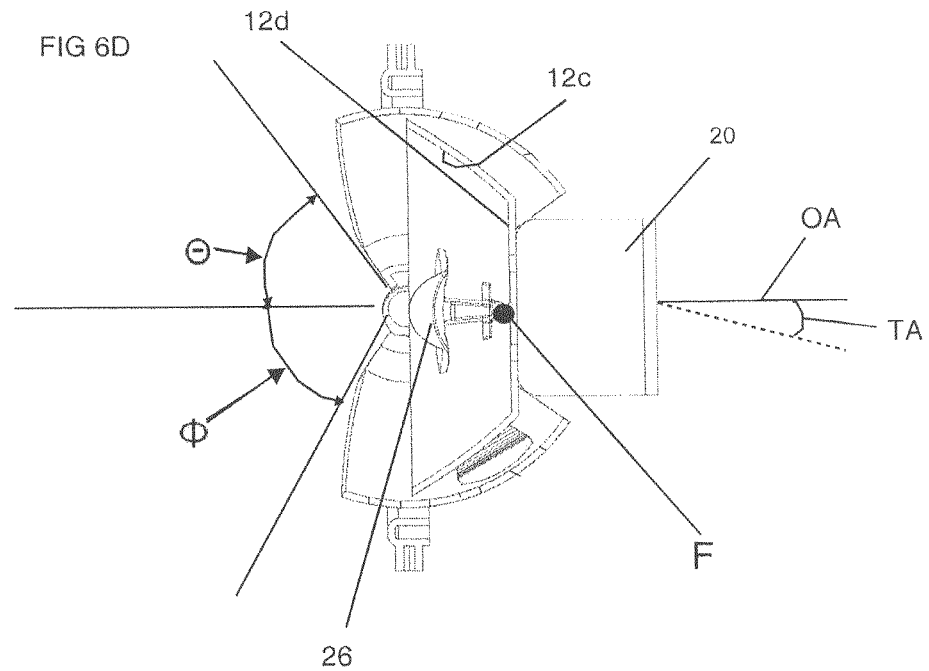

When the first and second shutter or mask members 32 and 34 are actuated to the fully retracted position illustrated in FIGS. 5D, 6D and 7D, all the light from the at least one light source 18, including light reflective from the top and bottom reflective areas 12g and 12i, respectively, contributes, thereby producing the high beam mode of operation using the single light source 18. As mentioned previously and as shown in Table I earlier, the reflector 12 and associated first and second shutter or mask members 32 and 34 may be tilted upward 2° as described earlier herein to further facilitate the high beam mode of operation.

During the glare-free high beam mode of operation illustrated in FIGS. 5C, 6C and 7C, the bottom or second shutter or mask member 34 is at least partly closed to cover the area 12i (FIG. 12D) of the reflector 12, thereby preventing at least some portion of the high beam contributor (i.e., light reflected off the bottom area 12i) to be blocked or occluded, thereby generating the glare-free high beam. The glare-free high beam mode of operation may require the use of at least one second actuator (not shown) that can cause the upper or first shutter or mask member 32 to be retracted to a fully open position of about 45° while retracting or causing the lower or second shutter or mask member 34 to be open only about 30°.

Some additional or further considerations:

1. It should be understood that while the four different modes of operation have been described, other modes could also be performed. As mentioned earlier herein, the gimbal 41 is adapted so that it can be pivotally driven by the driver or actuator 64 (FIG. 7A) to provide a swiveling or bending light function for use in vehicles with adaptive steering lighting that is responsive, for example, to turning movement of the vehicle.

2. Another function not shown is dynamic shadowing of high beam or the "beam attic" function which is that while in High Beam mode there is a vertical cutoff of light where in the center of the beam either the right of left side of the light in high beam mode is shadowed to stop glare for other drivers. The left hand lamp would have a high beam shadow to the right side, as the right hand lamp would have a shadow to the left side. A camera and control system (not shown) would then talk to each headlamp tell the headlamp to swivel right and left to maintain a shadow for a detected object (car headlight or taillights). This shadow would be dynamic changing shape and location based on inputs for the vehicle camera and software systems.

Figure 13:
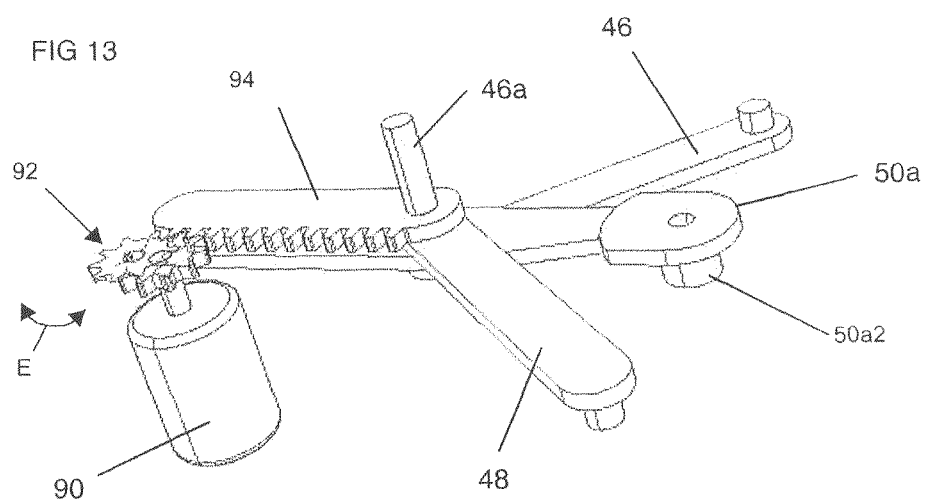
FIG. 13 is a view of an alternative drive system utilizing a rack and pinion system.

3. Although the driver or actuator 40 has been shown and described as being a linear actuator, other gears, motors and linkage could be used. For example, FIG. 13 shows a rack and pinion drive motor 90 having a gear 92 and rack 94 which moves in the direction of double arrow E in FIG. 13 and could be used to drive link arms 46 and 48 and first and second shutter or mask members 32 and 34.

It should be understood that the common pivot axis PA (FIGS. 2 and 4) is generally horizontal. The term "generally horizontal" means that the common pivot axis PA does not have to be exactly horizontal in all embodiments. The pivot member 70 is adapted to tilt the reflector 12 and the first and second shutter or mask members 32 and 34 about the pivot axis PA. In contrast, the pivot axis PA2 (FIG. 7A) is generally vertical.

Alternatively, and although not shown, the at least one actuator or driver 40 could include one or more actuators or drivers (not shown) and linkage (not shown) that could be provided to directly drive to the heat sink 20, reflector 12 and shutter or mask members 32 and 34 or the like to provide the tilting and bending movement.

4. It is important to note that the DRL lens or spreader lens 80 is at least partially covered by at least one of the first or second shutter or mask members 32 or 34 when it is not in the DRL mode of operation, such as, for example, when it is in the low beam mode of operation as illustrated in FIG. 6B. Likewise, the DRL lens or spreader lens 80 is also at least moved to a retracted position and covered by at least one of the first or second shutter or mask members 32 or 34 when in the full high beam mode of operation, illustrated in FIGS. 5C, 6C and 7C.

5. As mentioned earlier relative to FIG. 7A, the headlamp 10 could comprise the bending driver or actuator 64 (shown schematically for ease of illustration) for providing the pivotal movement in the direction of arrow B as described earlier herein. With the tilting capabilities in the direction of double arrow D in FIG. 2 and the bending or pivoting in the direction of double arrow B in FIG. 7A and the use of the gimbal 41, the headlamp 10 has the ability to move polyaxially, thereby resulting in improved generation and control of the light beam pattern.

6. Advantageously, the system and method described herein provide a low cost LED headlamp 10 that provides the plurality of light beam modes that utilize a single light source 18 and driver system. It should be understood that the at least one light source 18 may be a single LED or the source could be a plurality or array of LEDs as mentioned previously. The important feature to understand is that a single light source is being used to perform all of the beam functions described. The use of the shutter assembly and the plurality of shutters or mask members 32, 34 that are selectively displaceable in order to occlude the light to perform the plurality of different light beam modes utilizing the same light source 18 for each of the plurality of different light beam modes.

7. While the first and second shutter or mask members 32 and 34 are shown being generally spherical, they could be provided in other shapes and sizes, so long as they occlude or mask light as provided herein.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

It should also be understood that the entire headlamp assembly 10 can be adapted in order to meet the requirements from national regulations.

This invention, including all embodiments shown and described herein, could be used alone or together and/or in combination with one or more of the features covered by one or more of the claims set forth herein, including but not limited to one or more of the features or steps mentioned in the bullet list in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A headlamp comprising:
   a reflector having a reflective inner surface defining a cavity with an open end facing a field to be illuminated and having a focus, said reflector being adapted to receive at least one LED light source comprising at least one LED positioned at or near said focus and adapted to generate light rays;

a lens intermediate said at least one LED light source and said field to be illuminated and adapted to receive at least some of said light rays and produce a light beam toward said field to be illuminated; and a shutter assembly having a plurality of shutters or mask members that are adapted to be moved to a plurality of different predetermined positions so that they can cooperate to occlude or mask at least a portion of said light rays to produce a plurality of different light beam modes, respectively, toward said field to be illuminated;

wherein said plurality of shutters or mask members being generally opaque to occlude or mask light;

each of said plurality of shutters or mask members having at least one edge, said at least one edge of a first one of said plurality of shutters or mask members cooperating with said at least one edge of a second one of said plurality of shutters or mask members to provide or form a generally horizontal opening whose size is varied by pivoting said first one of said plurality of shutters or mask members and causing said edges to move towards or away from each other to change a size of said generally horizontal opening, thereby providing said plurality of different light beam modes toward said field to be illuminated.

2. The headlamp as recited in claim 1 wherein said headlamp further comprises:

at least one actuator or driver coupled to said plurality of shutters or mask members and adapted to drive said plurality of shutters or mask members between open and closed positions to at least one of said plurality of different predetermined positions in order to produce at least one of said plurality of different light beam modes.

3. The headlamp as recited in claim 1 wherein said plurality of different light beam modes comprises at least two of the following: a low beam mode, a high beam mode, a glare free high beam mode and a daytime running light (DRL) beam mode;

said at least one LED light source providing the light beam for said at least two of said plurality of different light beam modes.

4. The headlamp as recited in claim 1 wherein said plurality of different light beam modes comprises all of the following: a low beam mode, a high beam mode, a glare free high beam mode and a daytime running light (DRL) beam mode;

said at least one LED light source providing the light beam for each of said plurality of different light beam modes.

5. The headlamp as recited in claim 1 wherein said plurality of shutters or mask members at least partially covers the lens when operated as a low beam projector.

6. The headlamp as recited in claim 1 wherein said headlamp comprises a spreader lens comprising a plurality of predetermined positions.

7. The headlamp as recited in claim 1 wherein said plurality of shutters are at least partially spherical.

8. The headlamp as recited in claim 1 wherein each of said plurality of shutters or mask members comprise at least a portion that is generally arcuately shaped about a pivotal axis and also an axis that is substantially perpendicular to said pivotal axis.

9. The headlamp as recited in claim 2 wherein said plurality of shutters or mask members comprises a first shutter or mask member and a second shutter or mask member;

said at least one actuator or driver being drivingly coupled to said first and second shutter or mask members and adapted to drive them in order to produce at least one of said plurality of different light beam modes.

10. The headlamp as recited in claim 2 wherein said at least one actuator drives said plurality of shutters substantially simultaneously.

11. The headlamp as recited in claim 9 wherein each of said first shutter or mask member and said second shutter or mask member comprise a shape having a portion that lies in a generally spherical plane.

12. The headlamp as recited in claim 9 wherein said first and second shutter or mask members have a common pivot axis, said at least one actuator or driver being adapted to drive said first and second shutter or mask members about said common axis.

13. The headlamp as recited in claim 1 wherein said plurality of different light beam modes comprise a low beam mode, a high beam mode, a glare free high beam mode and a daytime running light (DRL) beam mode.

14. The headlamp as recited in claim 12 wherein said at least one actuator or driver substantially simultaneously pivotally drives said first and second shutter or mask members about said common pivot axis to said plurality of different predetermined positions.

15. The headlamp as recited in claim 14 wherein said common pivot axis is a generally horizontal pivot axis.

16. A headlamp comprising:

a reflector having a reflective inner surface defining a cavity with an open end facing a field to be illuminated and having a focus, said reflector being adapted to receive at least one LED light source comprising at least one LED positioned at or near said focus and adapted to generate light rays;

a lens intermediate said at least one LED light source and said field to be illuminated and adapted to receive at least some of said light rays and produce a light beam toward said field to be illuminated; and a shutter assembly having a plurality of shutters or mask members that are adapted to be moved to a plurality of different predetermined positions so that they can cooperate to occlude or mask at least a portion of said light rays to produce a plurality of different light beam modes, respectively, toward said field to be illuminated;

wherein said headlamp comprises a pivot member for pivoting or tilting said reflector a predetermined angle about a tilting axis for each of said plurality of different light beam modes substantially simultaneously during moving of said plurality of shutters or mask members to said plurality of different predetermined positions.

17. The headlamp as recited in claim 16 wherein said pivot member comprises a camming slot for receiving a follower, at least one of said camming slot or said follower being associated with said reflector and the other of which moves in response to at least one actuator actuating said plurality of shutters or mask members, thereby causing said pivoting or tilting of said reflector.

18. The headlamp as recited in claim 17 wherein said predetermined angle is less than or equal to plus or minus 2 degrees.

19. A headlamp comprising:

a reflector having a reflective inner surface defining a cavity with an open end facing a field to be illuminated and having a focus, said reflector being adapted to receive at least one LED light source comprising at least one LED positioned at or near said focus and adapted to generate light rays;

a lens intermediate said at least one LED light source and said field to be illuminated and adapted to receive at least some of said light rays and produce a light beam toward said field to be illuminated; and a shutter assembly having a plurality of shutters or mask members that are adapted to be moved to a plurality of different predetermined positions so that they can cooperate to occlude or mask at least a portion of said light rays to produce a plurality of different light beam modes, respectively, toward said field to be illuminated;

wherein said headlamp further comprises at least one actuator or driver coupled to said plurality of shutters or mask members and adapted to drive said plurality of shutters or mask members between open and closed positions to at least one of said plurality of different predetermined positions in order to produce at least one of said plurality of different light beam modes;

wherein said plurality of shutters or mask members comprises a first shutter or mask member and a second shutter or mask member;

said at least one actuator or driver being drivingly coupled to said first and second shutter or mask members and adapted to drive them in order to produce at least one of said plurality of different light beam modes;

wherein said at least one actuator further comprises a linear actuator and linkage adapted to cause said first and second shutter or mask members to pivot in response to linear movement of at least a portion of said linkage.

20. A headlamp comprising:

a reflector having a reflective inner surface defining a cavity with an open end facing a field to be illuminated and having a focus, said reflector being adapted to receive at least one LED light source comprising at least one LED positioned at or near said focus and adapted to generate light rays;

a lens intermediate said at least one LED light source and said field to be illuminated and adapted to receive at least some of said light rays and produce a light beam toward said field to be illuminated; and a shutter assembly having a plurality of shutters or mask members that are adapted to be moved to a plurality of different predetermined positions so that they can cooperate to occlude or mask at least a portion of said light rays to produce a plurality of different light beam modes, respectively, toward said field to be illuminated;

wherein said headlamp further comprises at least one actuator or driver coupled to said plurality of shutters or mask members and adapted to drive said plurality of shutters or mask members between open and closed positions to at least one of said plurality of different predetermined positions in order to produce at least one of said plurality of different light beam modes;

wherein said plurality of shutters or mask members comprises a first shutter or mask member and a second shutter or mask member;

said at least one actuator or driver being drivingly coupled to said first and second shutter or mask members and adapted to drive them in order to produce at least one of said plurality of different light beam modes;

wherein said at least one actuator further comprises a bending actuator for pivoting said reflector and said first and second shutter or mask members about a generally vertical axis to facilitate providing a bending light function.

21. A headlamp comprising:

a reflector having a reflective inner surface defining a cavity with an open end facing a field to be illuminated and having a focus, said reflector being adapted to receive at least one LED light source comprising at least one LED positioned at or near said focus and adapted to generate light rays;

a lens intermediate said at least one LED light source and said field to be illuminated and adapted to receive at least some of said light rays and produce a light beam toward said field to be illuminated; and a shutter assembly having a plurality of shutters or mask members that are adapted to be moved to a plurality of different predetermined positions so that they can cooperate to occlude or mask at least a portion of said light rays to produce a plurality of different light beam modes, respectively, toward said field to be illuminated;

wherein said headlamp further comprises at least one actuator or driver coupled to said plurality of shutters or mask members and adapted to drive said plurality of shutters or mask members between open and closed positions to at least one of said plurality of different predetermined positions in order to produce at least one of said plurality of different light beam modes;

wherein said plurality of shutters or mask members comprises a first shutter or mask member and a second shutter or mask member;

said at least one actuator or driver being drivingly coupled to said first and second shutter or mask members and adapted to drive them in order to produce at least one of said plurality of different light beam modes;

wherein said at least one actuator further comprises a bending actuator for pivoting said reflector and said first and second shutter or mask members about a generally vertical axis to facilitate providing a bending light function.

22. The headlamp as recited in claim 21 wherein said headlamp further comprises a gimbal having a gimbal frame coupled to a headlamp housing, said reflector, said lens and said shutter assembly being pivotally mounted inside said gimbal frame so that they can pivot about a generally horizontal axis and said bending actuator being coupled to said gimbal and pivotally driving it about a generally vertical axis.

* * * * *